(12) United States Patent
Nishida

(10) Patent No.: US 9,471,264 B2
(45) Date of Patent: Oct. 18, 2016

(54) INFORMATION PROCESSING SYSTEM, INFORMATION PROCESSING METHOD, AND RECORDING MEDIUM

(71) Applicant: Takayori Nishida, Tokyo (JP)

(72) Inventor: Takayori Nishida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/642,915

(22) Filed: Mar. 10, 2015

(65) Prior Publication Data

US 2015/0178024 A1    Jun. 25, 2015

Related U.S. Application Data

(63) Continuation of application No. 13/906,593, filed on May 31, 2013, now Pat. No. 9,001,348.

(30) Foreign Application Priority Data

Jun. 12, 2012 (JP) ................................. 2012-132555
Feb. 20, 2013 (JP) ................................. 2013-031065

(51) Int. Cl.
*G06F 3/12* (2006.01)
*G06K 15/00* (2006.01)

(52) U.S. Cl.
CPC ........... *G06F 3/1222* (2013.01); *G06F 3/1204* (2013.01); *G06F 3/1238* (2013.01); *G06F 3/1267* (2013.01); *G06F 3/1288* (2013.01); *G06K 15/4095* (2013.01)

(58) Field of Classification Search
USPC ....................................................... 358/1.14
See application file for complete search history.

(56) References Cited

U.S. PATENT DOCUMENTS 8,332,958 B2    12/2012  Nishimi et al.
2003/0002898 A1*  1/2003  Kimura .............. H04N 1/00188
                                                        400/76

(Continued)

FOREIGN PATENT DOCUMENTS

EP          2107453         10/2009
JP       2001-051915         2/2001

(Continued)

OTHER PUBLICATIONS

Extended European Search Report dated Feb. 24, 2014.

(Continued)

*Primary Examiner* — Ngon Nguyen
(74) *Attorney, Agent, or Firm* — IPUSA, PLLC

(57) ABSTRACT

An information processing system includes at least one information processor, an output data reception part configured to receive output data or output target data via a network, a determination part configured to determine whether user identification information, which is to be correlated with the received output data or output data generated based on the output target data, is specified from user information stored in a user information storage part, a storing part configured to store data identification information and the received or generated output data in correlation with each other in a data storage part when the user identification information is not specified; a notification part configured to give notice of the data identification information via the network; and a transmission part configured to transmit, via the network, the received or generated output data correlated with the user identification information or the data identification information received via the network.

19 Claims, 27 Drawing Sheets

(56) References Cited

U.S. PATENT DOCUMENTS

| 2003/0107762 | A1* | 6/2003 | Kinoshita | G06Q 10/107 |
| | | | | 358/1.15 |
| 2004/0001226 | A1* | 1/2004 | Ohtuka | G06F 3/1292 |
| | | | | 358/1.15 |
| 2004/0190049 | A1 | 9/2004 | Itoh | |
| 2009/0122334 | A1 | 5/2009 | Soneoka | |
| 2009/0244595 | A1 | 10/2009 | Kim et al. | |
| 2010/0185858 | A1* | 7/2010 | Nishimi | H04L 63/08 |
| | | | | 713/168 |

FOREIGN PATENT DOCUMENTS

| JP | 2004-236348 | 8/2004 |
| JP | 2005-092731 | 4/2005 |
| JP | 2009-135780 | 6/2009 |
| JP | 2010-100007 | 5/2010 |
| JP | 2010-170232 | 8/2010 |

OTHER PUBLICATIONS

Russian Office Action dated Oct. 13, 2014.

* cited by examiner

FIG.6

| USERNAME | PASSWORD | EMAIL ADDRESS | ・・・・・ |
|---|---|---|---|
| A | ・・・・・ | aaa@xxxxx | ・・・・・ |
| B | ・・・・・ | bbb@xxxxx | ・・・・・ |
| ⋮ | ⋮ | ⋮ | ⋮ |

| JOB NAME | USER MODE | USERNAME | PIN CODE | PRINT DATA | ... |
|---|---|---|---|---|---|
| XXX | G | | 1234 | ... | ... |
| YYY | U | A | | ... | ... |
| .. | .. | .. | .. | .. | .. |

| COMPANY CODE | RECEIVING ADDRESS |
|---|---|
| COMPANY 1 | office1@cloud.co.jp |
| COMPANY 2 | office2@cloud.co.jp |
| COMPANY 3 | office3@cloud.co.jp |
| : | : |

FIG.13

| JOB NAME | USER MODE | USERNAME | PIN CODE | PRINT DATA | COMPANY CODE | ... |
|---|---|---|---|---|---|---|
| XXX | G |  | 1234 | ... | COMPANY 1 | ... |
| YYY | U | A |  | ... | COMPANY 2 | ... |
| .. | .. | .. | .. | .. | .. | .. |

FIG.14

| COMPANY CODE | APPARATUS ID |
|---|---|
| COMPANY 1 | ... |
| COMPANY 1 | ... |
| : | : |
| COMPANY 2 | ... |
| : | : |

64

| ORGANIZATION CODE | PIN CODE |
|---|---|
| XXX | 100 |
| YYY | 101 |
| YYY | 102 |
| XXX | 103 |

FIG.27

| ORGANIZATION CODE | USERNAME | PASSWORD |
|---|---|---|
| COMPANY 1 | A | ... |
| COMPANY 2 | B | ... |

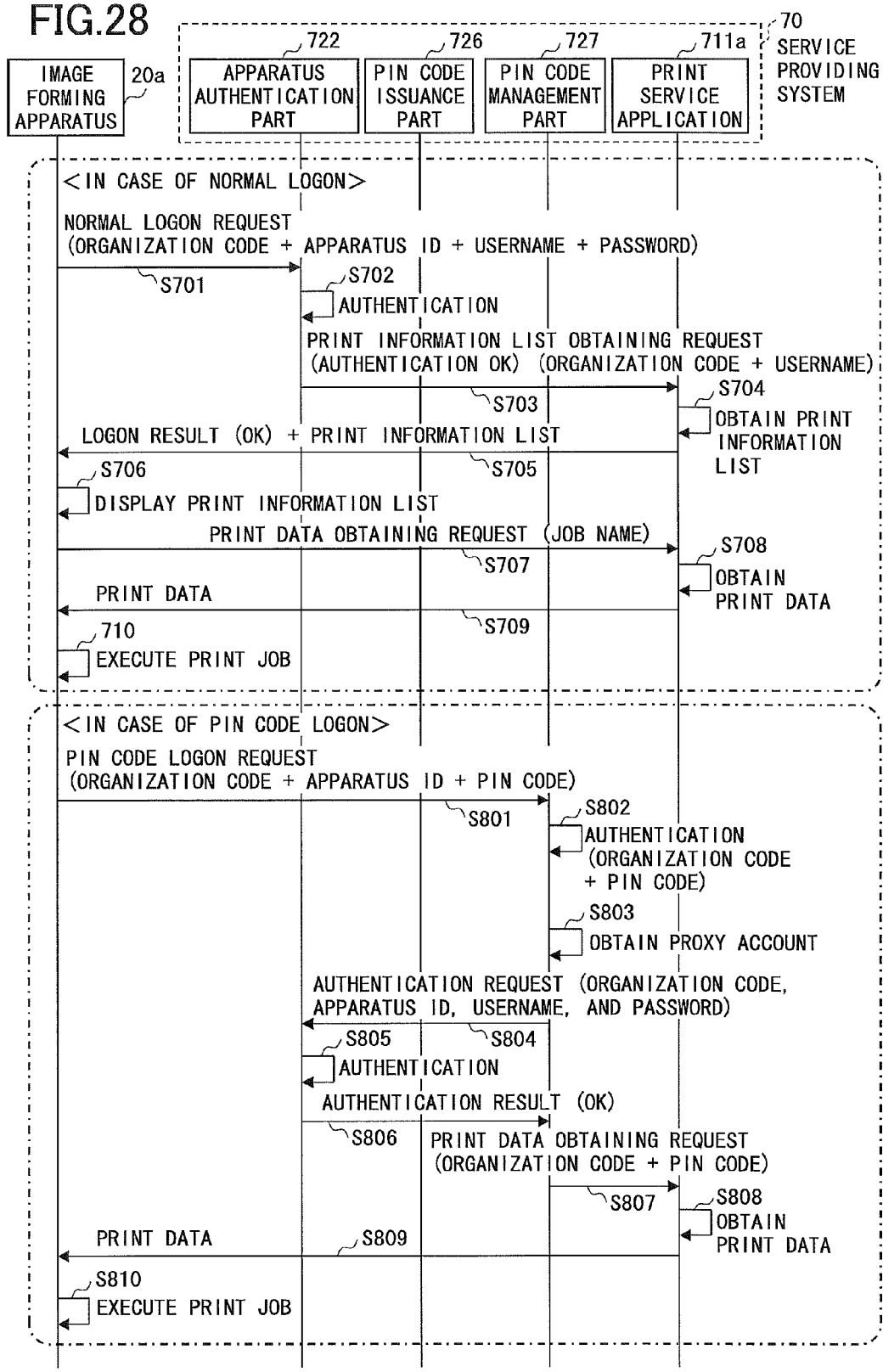

INFORMATION PROCESSING SYSTEM, INFORMATION PROCESSING METHOD, AND RECORDING MEDIUM

CROSS-REFERENCE TO RELATED APPLICATIONS

The present application is a continuation of U.S. patent application Ser. No. 13/906,593, filed on May 31, 2013, which is based upon and claims the benefit of priority of Japanese Patent Applications No. 2012-132555, filed on Jun. 12, 2012, and No. 2013-031065, filed on Feb. 20, 2013. The disclosures of the prior applications are hereby incorporated herein in their entirety by reference.

BACKGROUND OF THE INVENTION

1. Field of the Invention

The present invention relates to an information processing system, an information processing method, and a recording medium.

2. Description of the Related Art

Instead of immediately printing print data in response to a print command input at a personal computer (PC) or the like by a user, some systems correlate the print data with the username of the user and store the print data in a predetermined server or a storage device inside an image forming apparatus. When the user enters the username and a password through the operations panel of the image forming apparatus, the image forming apparatus executes authentication with respect to the username and the password. When the user is authenticated, the image forming apparatus causes the list information of print data correlated with the username among the print data stored in the storage device to be displayed on the operations panel. The image forming apparatus obtains print data selected from the list information and prints the selected print data.

According to such systems, printed material is output when the user is close by the image forming apparatus. Therefore, it is possible to prevent the printed material from being left uncollected or being mistakenly taken away by others. As a result, it is possible to ensure the security of the printed information.

Reference may be made to Japanese Laid-Open Patent Applications No. 2004-236348 and No. 2001-051915 for related art.

SUMMARY OF THE INVENTION

According to an aspect of the present invention, an information processing system including at least one information processor, includes an output data reception part configured to receive output data or output target data via a network; a determination part configured to determine whether user identification information is specified from user information stored in a user information storage part, wherein the user identification information is to be correlated with the received output data or output data generated based on the output target data; a storing part configured to store data identification information and the received or generated output data in correlation with each other in a data storage part when the user identification information is not specified; a notification part configured to give notice of the data identification information via the network; and a transmission part configured to transmit, via the network, the received or generated output data correlated with the user identification information or the data identification information received via the network.

According to an aspect of the present invention, an information processing method includes receiving, by an information processing system including at least one information processor, output data or output target data via a network; determining, by the information processing system, whether user identification information is specified from user information stored in a user information storage part, wherein the user identification information is to be correlated with the received output data or output data generated based on the output target data; storing, by the information processing system, data identification information and the received or generated output data in correlation with each other in a data storage part when the user identification information is not specified; giving notice of, by the information processing system, the data identification information via the network; and transmitting, by the information processing system, via the network, the received or generated output data correlated with the user identification information or the data identification information received via the network.

According to an aspect of the present invention, a non-transitory computer-readable recording medium has a program recorded thereon, wherein the program causes a computer to execute: receiving output data or output target data via a network; determining whether user identification information is specified from user information stored in a user information storage part, wherein the user identification information is to be correlated with the received output data or output data generated based on the output target data; storing data identification information and the received or generated output data in correlation with each other in a data storage part when the user identification information is not specified; giving notice of the data identification information via the network; and transmitting, via the network, the received or generated output data correlated with the user identification information or the data identification information received via the network.

The object and advantages of the invention will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 6 is a diagram illustrating a configuration of a user information storage part according to the first embodiment;

FIG. 7 is a diagram illustrating a configuration of a print information storage part according to the first embodiment;

FIG. 12 is a diagram illustrating a configuration of an address corresponding information storage part according to the second embodiment;

FIG. 13 is a diagram illustrating a configuration of a print information storage part according to the second embodiment;

FIG. 14 is a diagram illustrating a configuration of a user apparatus information storage part according to the second embodiment;

FIG. 27 is a diagram illustrating a configuration of a proxy account management table according to the fourth embodiment; and FIG. 28 is a diagram for illustrating a procedure for a process for outputting print data according to the fourth embodiment.

DETAILED DESCRIPTION OF THE PREFERRED EMBODIMENTS

As described above, there are systems where the image forming apparatus allows an authenticated user to select print data from the list information of print data correlated with the username of the user and prints the selected print data. According to such systems, however, only a user who has an account for authentication in advance is allowed to execute printing. Accordingly, for example, a guest who has no account is inconvenienced by having to ask a person who has an account to perform printing. It is possible to prepare a guest account that is common to guests or visitors. In this case, however, a common account is assigned to multiple guests. Therefore, it is possible for one guest to manipulate the print data of another guest. This may result in the loss of characteristics of the above-described systems, such as ensuring the security of printed information.

Further, it is also possible to install an image forming apparatus for guest use. However, this increases an economic burden and also requires an installation space, and accordingly, is hardly considered as a good solution.

According to an aspect of the present invention, it is possible to provide even a user who has no account necessary for outputting data with authority to output data.

A description is given below, with reference to the accompanying drawings, of embodiments of the present invention.

Figure 1:
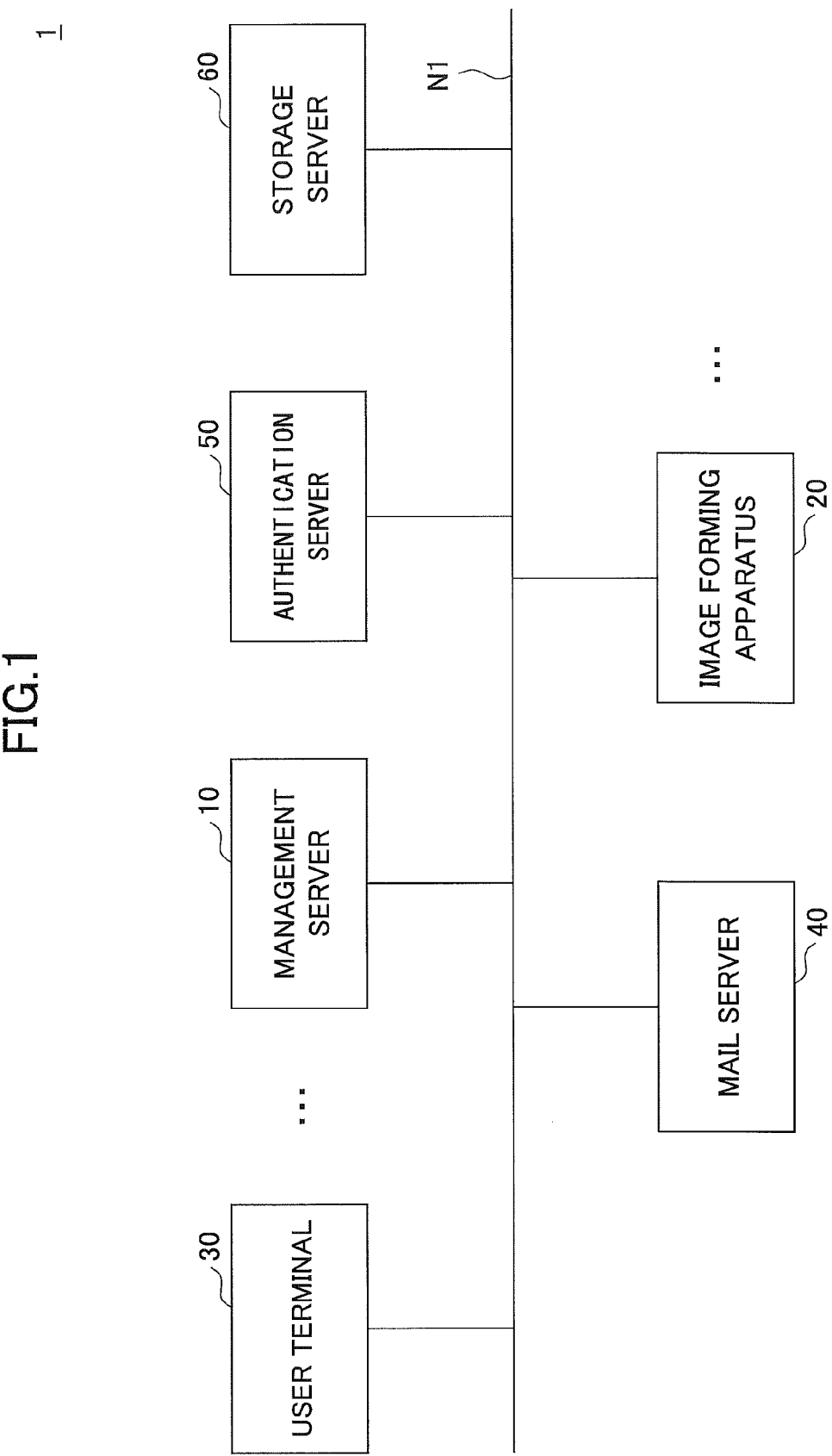
FIG. 1 is a diagram illustrating a configuration of a printing system according to a first embodiment.

FIG. 1 is a diagram illustrating a configuration of a printing system according to a first embodiment of the present invention. Referring to FIG. 1, a printing system 1 includes at least one user terminal 30, a mail server 40, a management server 10, an authentication server 50, a storage server 60, and at least one image forming apparatus 20, all of which are interconnected by a network N1 such as a local area network (LAN) or the Internet so as to be able to communicate with one another. The network N1 may be partly or entirely a wireless communications network. Further, there may be a mobile communication network between the user terminal 30 and the network N1. It is assumed that the printing system 1 is operated in an organization such as a company. In the first embodiment, this organization is referred to as "Company A."

The user terminal 30 is an information processor directly operated by a user of the printing system 1. For example, the user operates the user terminal 30 to input a request (print request) to the printing system 1 for printing. Examples of the user terminal 30 include personal computers (PCs), cellular phones, smartphones, tablet terminals, and personal digital assistants (PDAs). In the case where there are two or more user terminals 30, the user terminals 30 may be different in machine type from each other.

The mail server 40 is a computer that transfers an electronic mail (email) message transmitted from the user terminal 30 and an email message transmitted from the management server 10. For example, in response to a user's command, the user terminal 30 transmits an email message including a print request to the management server 10. The electronic data of an object of printing are attached to the email message including a print request. The data format of the electronic data is not limited to a predetermined format. The email message including a print request transmitted from the user terminal 30 is hereinafter referred to as "print request email message."

The authentication server 50 is a computer that manages the information on users (hereinafter referred to as "user information") of Company A on a user basis (that is, user by user), and executes processes using the user information. For example, the authentication server 50 executes authentication in response to an authentication request in which a username and a password are specified. Further, the authentication server 50 executes a process corresponding to an email address existence determination request for the determination of the existence of an email address and a process corresponding to a username obtaining request for the obtaining of a username corresponding to an email address. That is, the user information includes the email address of a user that is correlated with the username of the user.

The management server 10 is a computer that generates print data with respect to the electronic data included in a print request email message in response to the reception of the print request email message. The print data have a data format interpretable by the image forming apparatus 20. The management server 10 correlates the generated print data with the username of a user who has transmitted the print request email message or with an identifier generated for each print request email message, and transmits the print data correlated with the username or identifier to the storage server 60. When the username correlated with the source address of the print request email message is managed in the authentication server 50, the print data are correlated with the username. When the username correlated with the source address of the print request email message is not managed in the authentication server 50, the print data are correlated with an identifier generated for each print request email message. Hereinafter, the identifier is referred to as "personal identification number (PIN) code."

The storage server 60 is a computer that stores (retains) print data transmitted from the management server 10.

The image forming apparatus 20 is an apparatus that prints print data correlated with the username or PIN code input to the image forming apparatus 20 by a user among the print data stored in the storage server 60.

Figure 2:
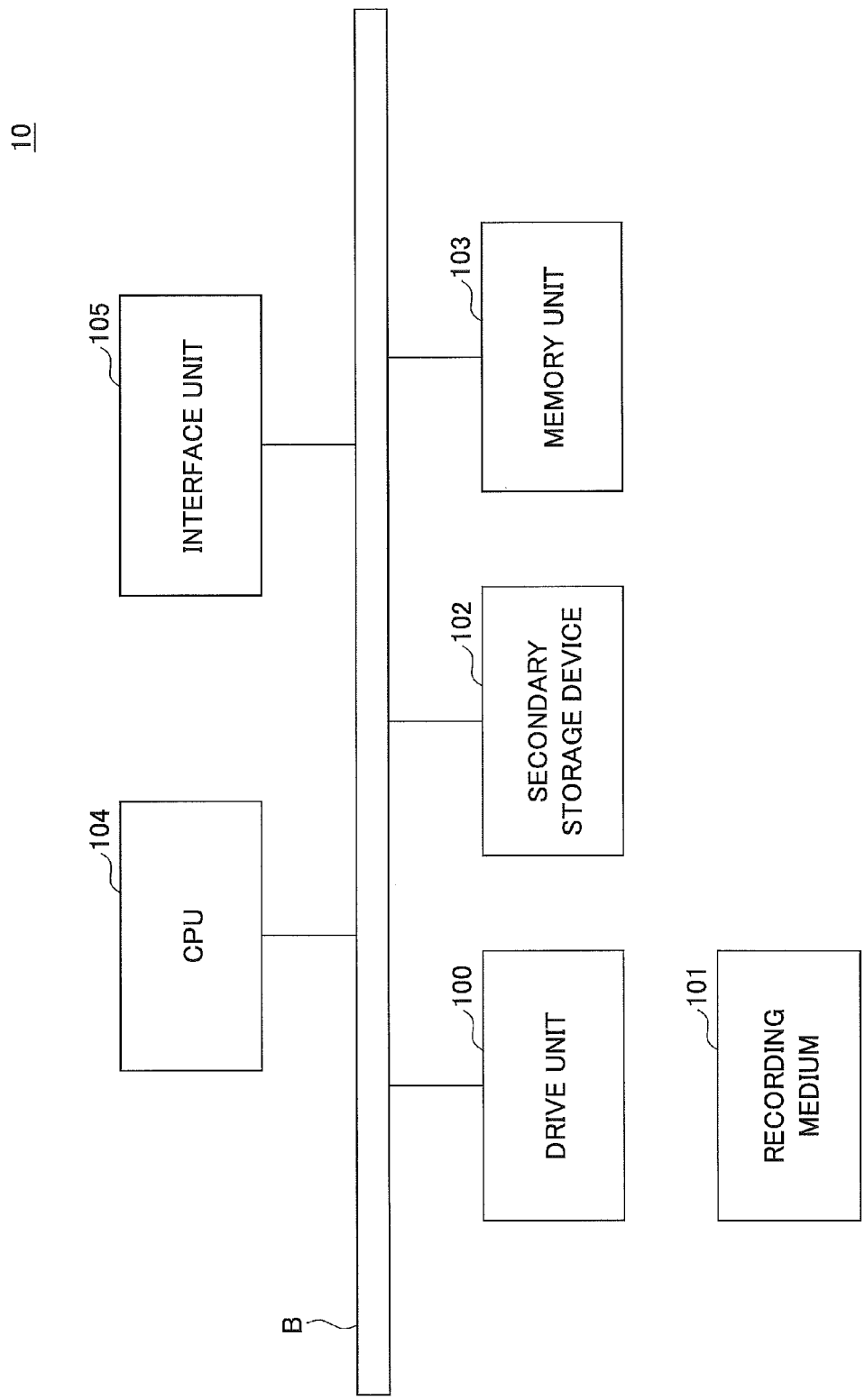
FIG. 2 is a diagram illustrating a hardware configuration of a management server according to the first embodiment.

FIG. 2 is a diagram illustrating a hardware configuration of a management server according to the first embodiment.

Referring to FIG. 2, the management server 10 includes a drive unit 100, a secondary storage device 102, a memory unit 103, a central processing unit (CPU) 104, and an interface unit 105, all of which are interconnected by a bus B.

A program that implements processes in the management server 10 is provided by way of a recording medium 101 such as a CD-ROM. When the recording medium 101 storing the program is loaded in the drive unit 100, the program is installed in the secondary storage device 102 from the recording medium 101 via the drive unit 100. However, the program does not always have to be installed from the recording medium 101, and may alternatively be downloaded from another computer via a network. The secondary storage device 102 stores files and data as well as installed programs.

The memory unit 103, in response to a command to activate a program, reads the program from the secondary storage device 102 and stores the read program. The CPU 104 executes functions pertaining to the management server 10 in accordance with a program stored in the memory unit 103. The interface unit 105 is used as an interface for connecting to a network.

Figure 3:
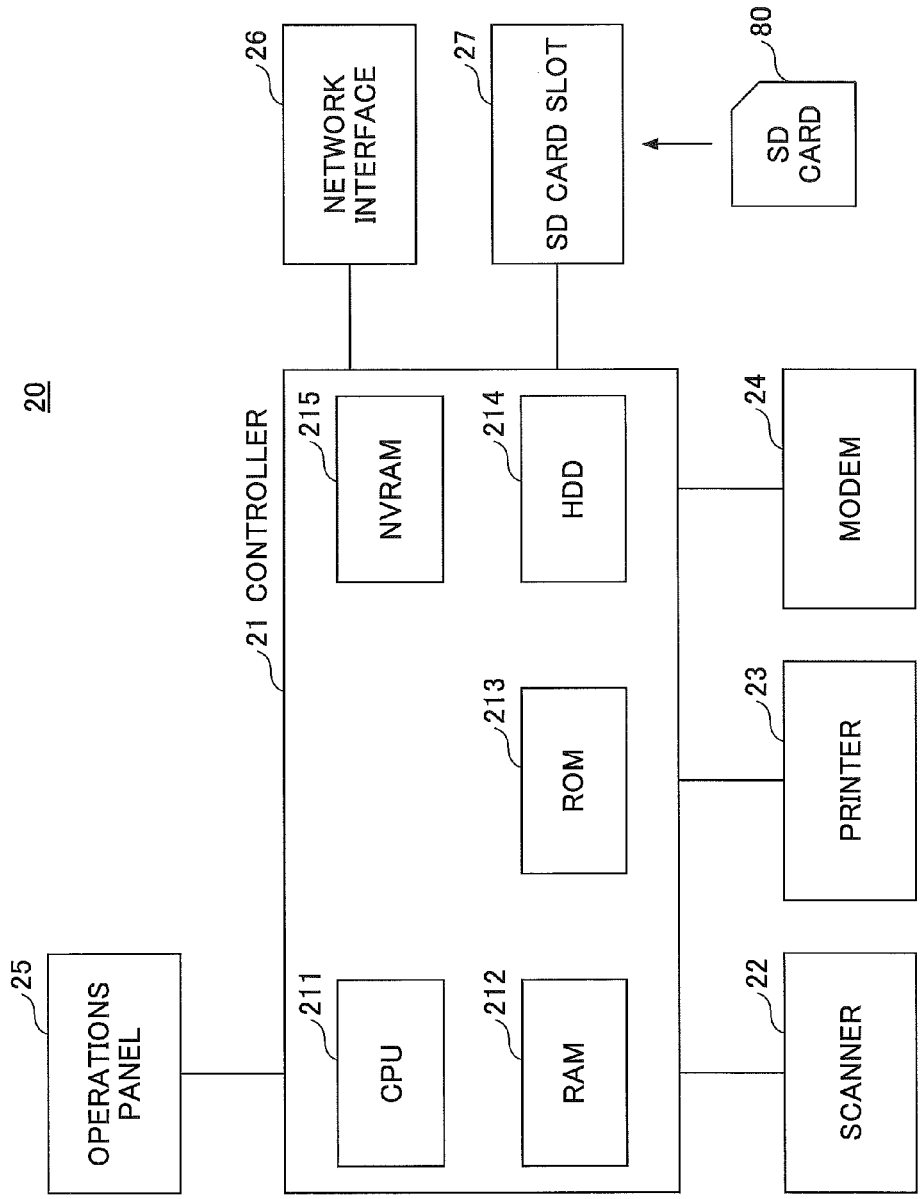
FIG. 3 is a diagram illustrating a hardware configuration of an image forming apparatus according to the first embodiment.

FIG. 3 is a diagram illustrating a hardware configuration of an image forming apparatus according to the first embodiment. Referring to FIG. 3, the image forming apparatus 20 includes hardware items including a controller 21, a scanner 22, a printer 23, a modem 24, an operations panel 25, a network interface 26, and an SD card slot 27.

The controller 21 includes a CPU 211, a random access memory (RAM) 212, a read-only memory (ROM) 213, a hard disk drive (HDD) 214, and a nonvolatile RAM (NVRAM) 215. The ROM 213 contains various programs and data used by the programs. The RAM 212 is used as a storage area for loading a program and as a work area for the loaded program. The CPU 211 implements various functions by executing a program loaded into the RAM 212. The HDD 214 contains programs and various data used by the programs. The NVRAM 215 contains various kinds of configuration information.

The scanner 22 is a hardware item (an image reading part) that reads image data from an original material. The printer 23 is a hardware item (a printing part) that prints print data on a recording medium such as printing paper. The modem 24 is a hardware item for connecting to a telephone line, and is used for transmission and reception of image data through facsimile communications.

The operations panel 25 is a hardware item that includes an input part for receiving a user's input, such as a button, and a display part such as a liquid crystal panel. The liquid crystal panel may have a touchscreen panel function. In this case, the liquid crystal panel also serves as the input part. The network interface 26 is a hardware item for connecting to a network (either wired or wireless) such as a LAN. The SD card slot 27 is used to read a program stored in an SD card 80. That is, according to the image forming apparatus 20, a program stored in the SD card 80 as well as a program stored in the ROM 213 may be loaded into the RAM 212 and executed. The SD card 80 may be replaced with other recording media (such as a CD-ROM and a universal serial bus (USB) memory). That is, a recording medium corresponding to the position of the SD card 80 is not limited to a predetermined kind. In this case, the SD card slot 27 may be replaced with a hardware item corresponding to the kind of recording medium that replaces the SD card 80.

According to this embodiment, the image forming apparatus 20 may be without the scanner 22 and the modem 24. That is, the image forming apparatus 20 may not be a multifunction machine and may be a printer.

Figure 4:
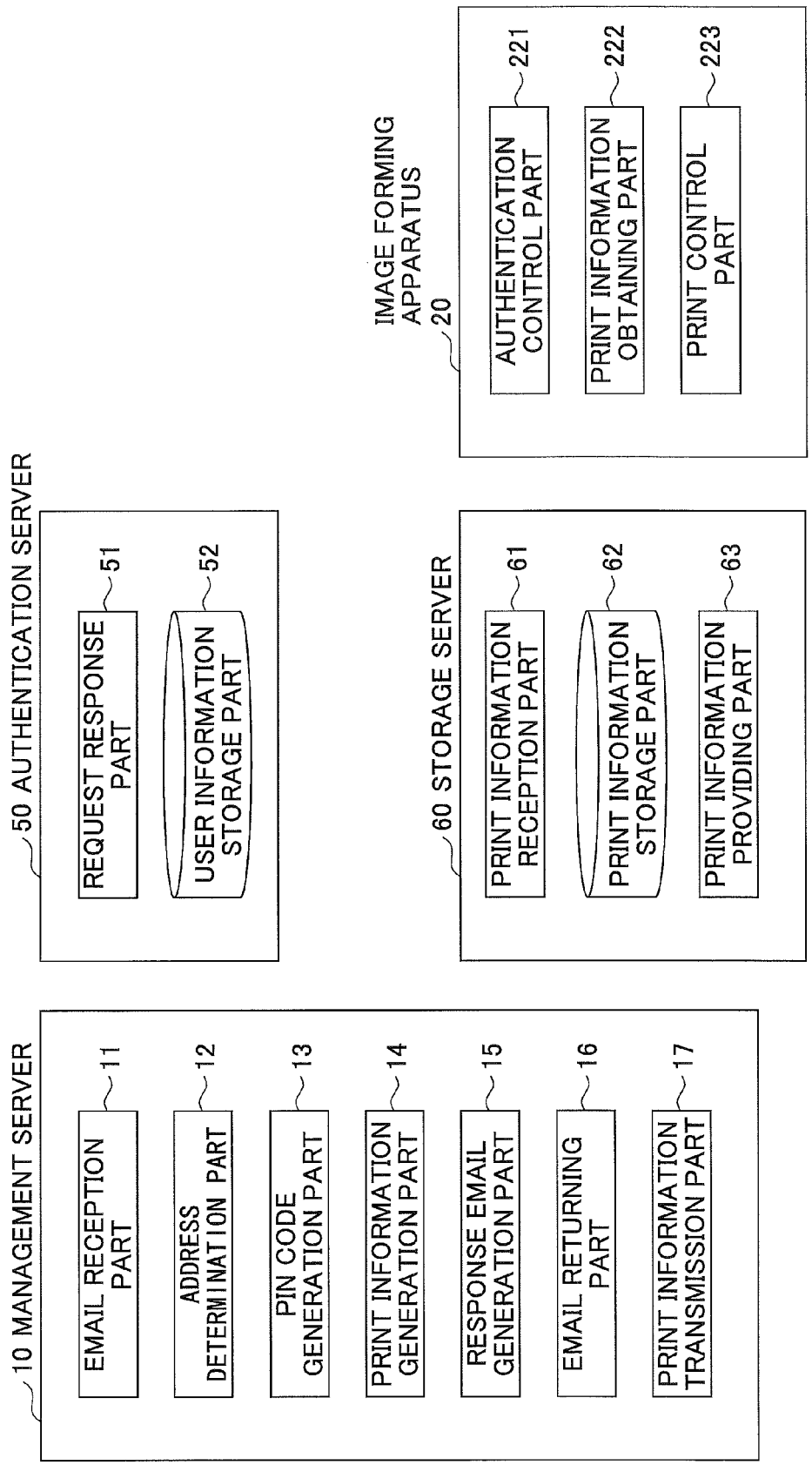
FIG. 4 is a diagram illustrating a functional configuration of a printing system according to the first embodiment.

FIG. 4 is a diagram illustrating a functional configuration of a printing system according to the first embodiment. Referring to FIG. 4, the management server 10 includes an email reception part 11, an address determination part 12, a PIN code generation part, a print information generation part 14, a response email generation part 15, an email returning part 16, and a print information transmission part 17, all of which are implemented by the processing that the CPU 104 is caused to execute by one or more programs installed in the management server 10.

The email reception part 11 receives a print request email message. The print request email message includes print target data (data to be printed) that a user wishes to get printed (for example, the text of email and/or an attached file). For example, a user transmits an email message including print target data from the user terminal 30 to an email address (destination) of a particular domain. By receiving an email message in which the particular domain is set as a destination, the email reception part 11 determines that the email message is a print request email message.

The address determination part 12 determines whether the source (email) address of a print request email message is registered with the authentication server 50 by transmitting an email address existence determination request for the determination of the existence of the source address of the print request email message to the authentication server 50. When the source address is registered with the authentication server 50, the address determination part 12 obtains a username corresponding to the source address from the authentication server 50. The PIN code generation part 13 generates a PIN code when the source address is not registered with the authentication server 50. The print information generation part 14 generates print information corresponding to a print request email message. The print information includes a username or a PIN code as well as information on print data and a print job for the print data.

The response email generation part 15 generates an email message (hereinafter referred to as "response email message") as a response to a print request email message. The response email message includes the identification information of individual print data. Further, when a PIN code is generated with respect to a print request email message, the response email message includes the PIN code.

The email returning part 16 returns a response email message to the source address of a print request email message. The print information transmission part 17 stores print information in the storage server 60 by transmitting the print information to the storage server 60.

The authentication server 50 includes a request response part 51 and a user information storage part 52. The user information storage part 52 stores the user information of each of employees of Company A. The request response part 51 executes processes corresponding to an authentication request, an email address existence determination request, and a request for obtaining a username corresponding to an email address. The request response part 51 is implemented by a process that the CPU of the authentication server 50 is caused to execute by a program installed in the authentication server 50. The user information storage part 52 may be implemented using a secondary storage device of the authentication server 50 or a storage device connected to the authentication server 50 via a network.

The storage server 60 includes a print information reception part 61, a print information storage part 62, and a print information providing part 63. The print information reception part 61 receives print information transmitted from the management server 10 and stores the received print information in the print information storage part 62. The print information providing part 63, in response to a request for obtaining print information from the image forming apparatus 20, retrieves print information including a username or a PIN code specified in the obtaining request from among the print information stored (retained) in the print information storage part 62 and returns the retrieved print information to the image forming apparatus 20.

The print information reception part 61 and the print information providing part 63 are implemented by a process that the CPU of the storage server 60 is caused to execute by one or more programs installed in the storage server 60. The print information storage part 62 may be implemented using a secondary storage device of the storage server 60 or a storage device connected to the storage server 60 via a network.

The image forming apparatus 20 includes an authentication control part 221, a print information obtaining part 222, and a print control part 223, all of which are implemented by a process that the CPU 211 is caused to execute by one or more programs installed in the image forming apparatus 20.

The authentication control part 221 receives a user's input of a username and a password or a user's input of a PIN code. When a username and a password are input (entered), the authentication control part 221 requests the authentication server 50 to authenticate the username and the password. The print information obtaining part 222 transmits a request for obtaining print information to the storage server 60. In the obtaining request, at least one of the username and the PIN code received by the authentication control part 221 is specified. The print control part 223 executes a printing process with respect to the print data obtained by the print information obtaining part 222.

Figure 5:
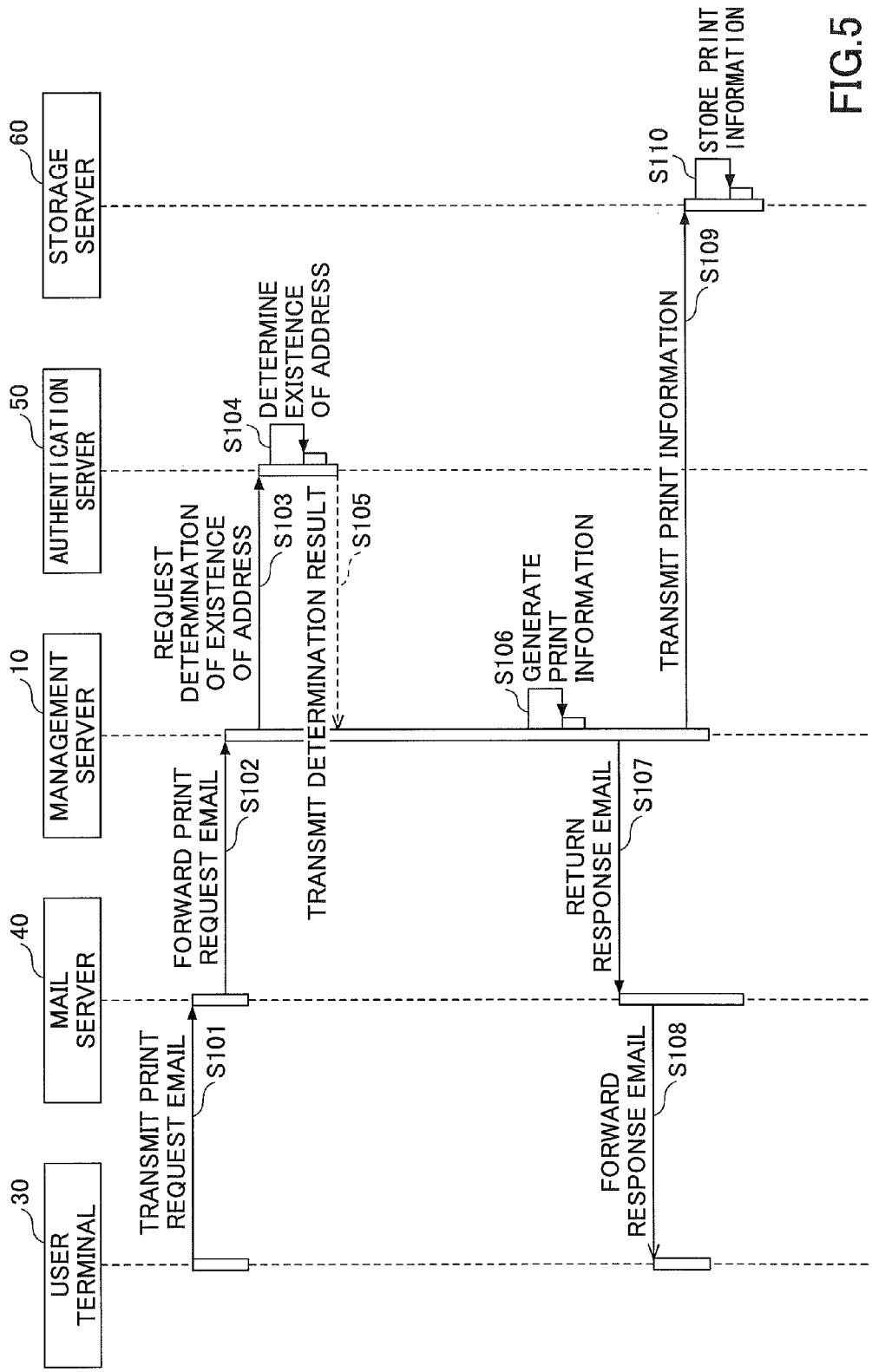
FIG. 5 is a sequence diagram for illustrating a procedure for a process for storing print data according to the first embodiment.

A description is given below of a procedure for a process executed in the printing system 1. FIG. 5 is a sequence diagram for illustrating a procedure for a process for storing print data according to the first embodiment.

In step S101, in response to a user's input of a command, the user terminal 30 transmits a print request email message to a predetermined email address. Electronic data that are to be printed are attached to the print request email message. The predetermined email address is, for example, an email address predetermined as an email address for the management server 10.

In step S102, the mail server 40 forwards the print request email message to the management server 10 in accordance with a common communications protocol for forwarding electronic mail.

The print request email message is received by the email reception part 11 of the management server 10. In response to the reception of the print request email message, in step S103, the management server 10 transmits an email address existence determination request for the determination of the existence of the source address of the print request email message to the authentication server 50, specifying the source address in the existence determination request. In response to the reception of the existence determination request, in step S104, the request response part 51 of the authentication server 50 determines whether the email address (source address) specified in the existence determination request is stored in the user information storage part 52.

FIG. 6 is a diagram illustrating a configuration of a user information storage part according to the first embodiment. Referring to FIG. 6, the user information storage part 52 stores user information with respect to each of employees of Company A. The user information includes, for example, a username, a password, and an email address. Multiple email addresses, for example, email addresses for a PC and a mobile terminal, may be registered for a single user.

Thus, in step S104, the request response part 51 determines whether the email address specified in the existence determination request is included in the user information stored in the user information storage part 52 as any of the email addresses of the user information.

Next, in step S105, the request response part 51 returns a response including the result of the determination to the management server 10. The result of the determination (the determination result) is information indicating the presence (existence) or absence of the email address.

In response to the reception of the determination result, in step S106, the management server 10 generates print information with respect to the print request email message. Then, in step S107, the email returning part 16 of the management server 10 returns a response email message as a response to the print request email message to the source address of the print request email message. In step S108, the mail server 40 forwards the response email message to the user terminal 30 that is the source of the print request email message. The response email message is generated in a print information generating process.

After returning the response email message, in step S109, the print information transmission part 17 of the management server 10 transmits the print information generated in the print information generating process, which includes print data and information associated with the print data, to the storage server 60.

In response to the reception of the print information, in step S110, the print information reception part 61 of the storage server 60 stores the print information in the print information storage part 62.

FIG. 7 is a diagram illustrating a configuration of a print information storage part according to the first embodiment. Referring to FIG. 7, the print information storage part 62 stores print information with respect to each print data (print data by print data). The print information includes a job name, a user mode, print data, and a username or a PIN code.

The job name is the identification information of each print data or each print job executed with respect to each print data. The user mode is information indicating whether the source address of a print request email message is managed in the user information storage part 52. In this embodiment, the user mode indicates whether a user who requests printing (a requesting user) is an inside (in-house) user or an outside user. The inside user refers to an employee of Company A. The outside user refers to a person other than the employees of Company A. Referring to FIG. 7, "U" indicates the inside user, and "G" indicates the outside user. The username is the username of the requesting user when the requesting user is an employee of Company A. The PIN code is a PIN code assigned to the requesting user when the requesting user is not an employee of Company A.

Figure 8:
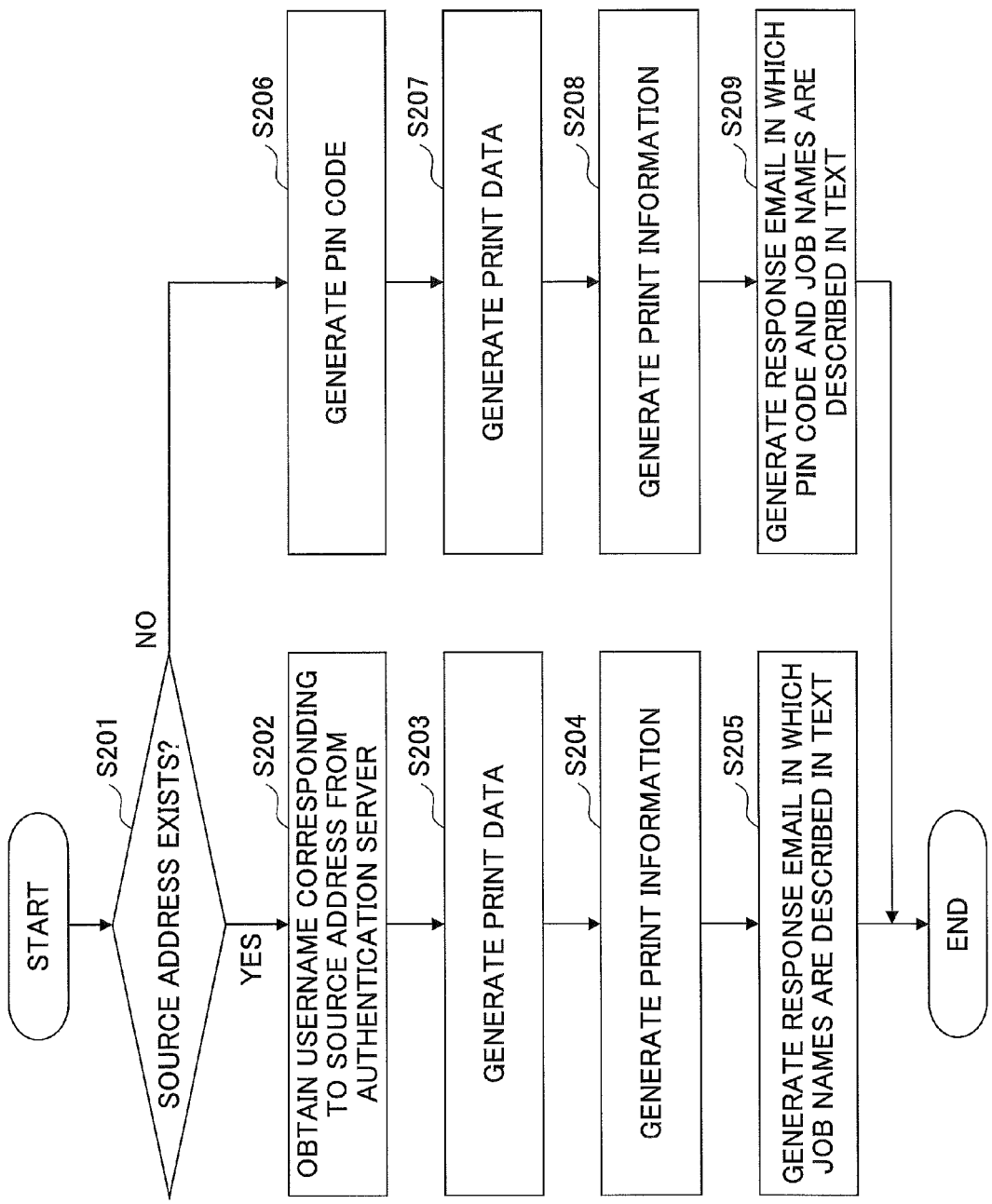
FIG. 8 is a flowchart for illustrating a procedure for a print information generating process according to the first embodiment.

Next, a description is given in detail of the process of step S106 of FIG. 5. FIG. 8 is a flowchart for illustrating a procedure for the print information generating process according to the first embodiment.

In step S201 of FIG. 8, the address determination part 12 of the management server 10 determines whether the determination result received in step S105 of FIG. 5 indicates the presence (existence) of the source address of the print request email message. If the determination result indicates the presence of the source address (YES in step S201), in step S202, the address determination part 12 obtains a username corresponding to the source address from the authentication server 50. That is, the username correlated with the source address in the user information storage part 52 is obtained.

Next, in step S203, the print information generation part 14 generates the print data of each of the text of the print request email message and the electronic data (print target data) attached to the print request email message. The print data may be generated for the attached electronic data alone. Further, when the electronic data are in an archive file format such as a zip format, including multiple files, the print information generation part 14 decompresses the electronic data, and generates print data for each of the decompressed files. Accordingly, multiple pieces of print data (multiple print jobs) may be generated for a single print request email message.

Next, in step S204, the print information generation part 14 generates print information with respect to each print data. That is, a job name is generated for each print data and is included in the print information. In the user mode of the individual print information, "U" is set. Further, the username obtained in step S202 is set in the individual print information. The print information generated in step S204 is transmitted to the storage server 60 in step S109 of FIG. 5.

Next, in step S205, the response email generation part 15 generates a response email message in which the job names of the print information are described in, for example, the text. The response email message is forwarded to the user terminal 30 of the source address of the print request email message in steps S107 and S108 of FIG. 5. It is possible for a user to know a job name corresponding to each print data generated in response to the print request email message by viewing the response email message. However, the response email message does not always have to be returned when the source address exists (is recorded) in the user information storage part 52. For example, in the case where a job name is generated based on the filename of electronic data, it is possible for a user to determine (understand) the contents of print data corresponding to each job name at the time of operating the image forming apparatus 20 as described below.

Meanwhile, if the determination result indicates the absence of the source address in step S201 (NO in step S201), in step S206, the PIN code generation part 13 generates a PIN code unique to the print request email message. The PIN code may be generated by any method as long as the value of the PIN code differs between print request email messages. However, it is preferable that the PIN code be composed of characters that may be easily entered through the operations panel 25 (FIG. 3) or a software keyboard displayed on the operations panel 25 of the image forming apparatus 20.

Next, in step S207, the print information generation part 14 generates the print data of each of the text of the print request email message and the electronic data (print target data) attached to the print request email message. The contents of the process of step S207 may be the same as the contents of the process of step S203.

Next, in step S208, the print information generation part 14 generates print information with respect to each print data. That is, a job name is generated for each print data and is included in the print information. In the user mode of the individual print information, "G" is set. Further, the PIN code generated in step S206 is set in the print information. The print information generated in step S208 is transmitted to the storage server 60 in step S109 of FIG. 5.

Next, in step S209, the response email generation part 15 generates a response email message in which the PIN code as well as the job names of the print information is described in, for example, the text. The response email message is forwarded to the user terminal 30 of the source address of the print request email message in steps S107 and S108 of FIG. 5. It is possible for a user who views the response email message to know the PIN code that needs to be entered into the image forming apparatus 20 at the time of printing the print data generated in response to the print request email message. Further, it is also possible for the user to know a job name corresponding to each print data. However, the response email message does not always have to include a job name.

Thereafter, a user who has transmitted the print request email message goes to a location where the image forming apparatus 20 is installed, and operates the image forming apparatus 20. Next, a description is given of a procedure for a process that the image forming apparatus 20 executes in response to a user's operation.

Figure 9:
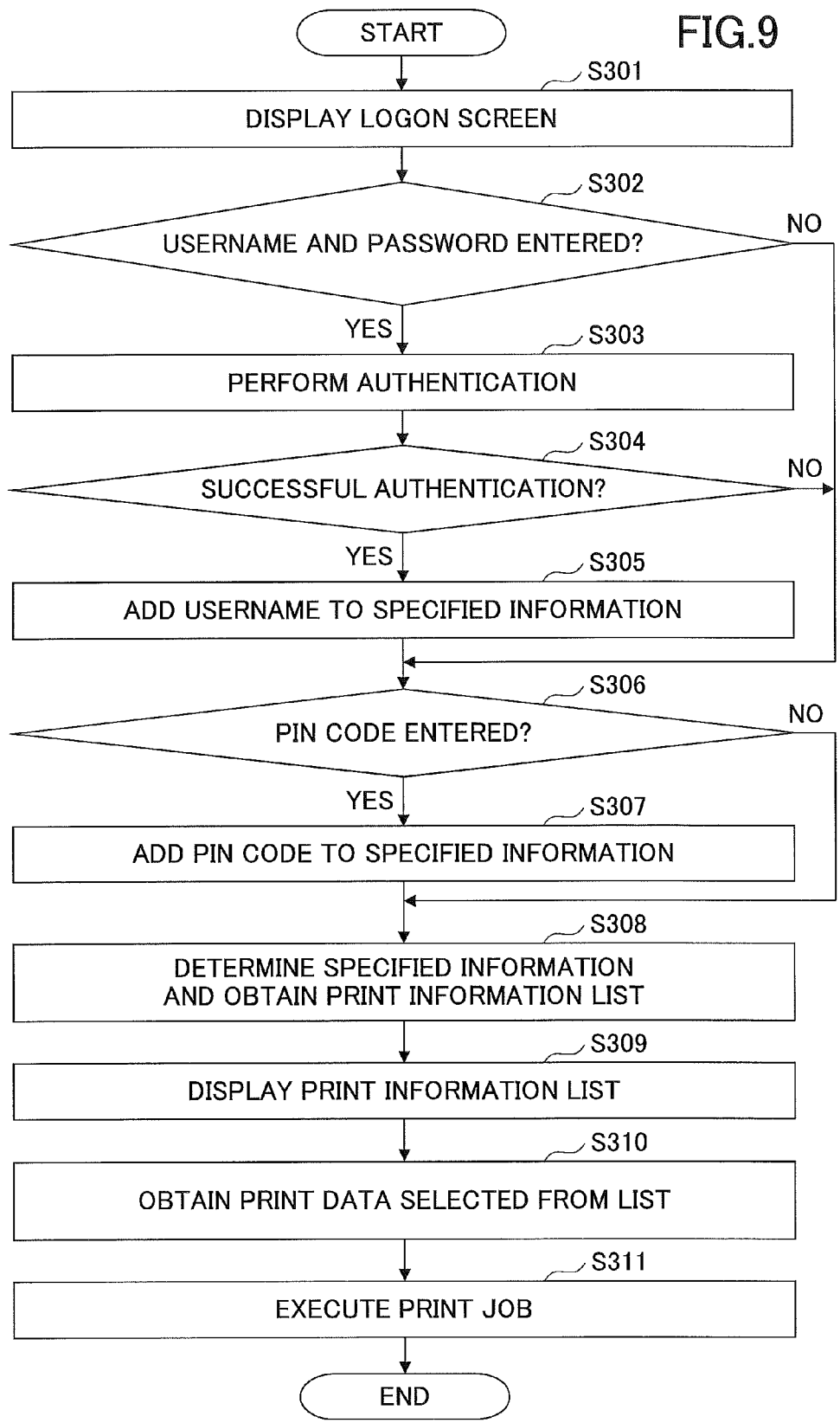
FIG. 9 is a flowchart for illustrating a procedure for a process executed by the image forming apparatus according to the first embodiment.

FIG. 9 is a flowchart for illustrating a procedure for a process executed by an image forming apparatus according to the first embodiment.

In step S301, the authentication control part 221 displays a logon screen on the operations panel 25 in response to, for example, a call for a print function for printing print data stored (retained) in the storage server 60.

Figure 10:
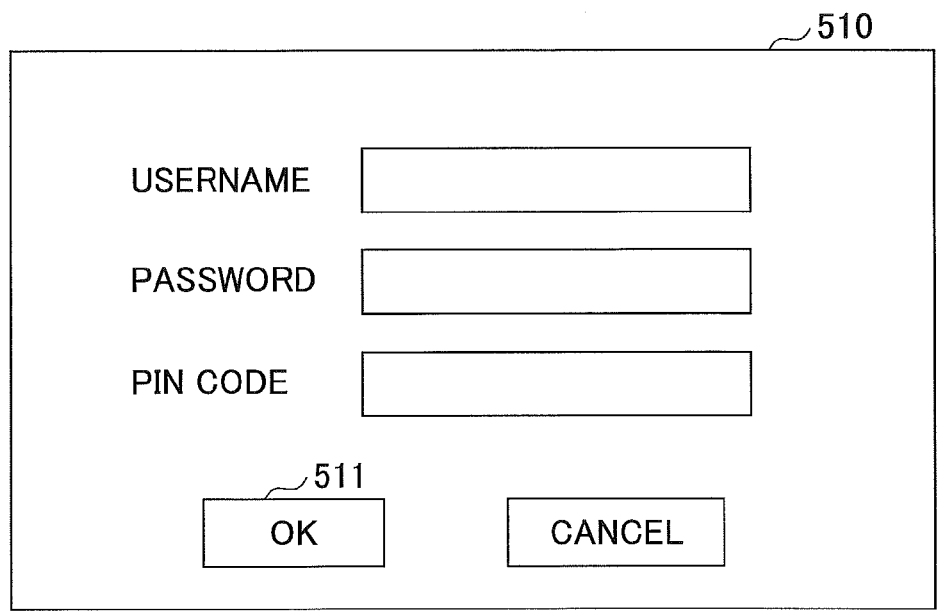
FIG. 10 is a diagram illustrating a display example of a logon screen according to the first embodiment.

FIG. 10 is a diagram illustrating a display example of a logon screen. Referring to FIG. 10, a logon screen 510 includes fields for entering a username, a password, and a PIN code.

For example, when an operator of the image forming apparatus 20 is an inside user, a username and a password are entered on the logon screen 510. When the operator is an outside user, a PIN code of which the operator has been notified by response mail is entered on the logon screen 510.

The inside user as well may enter a PIN code. For example, when the inside user transmits a print request email message from the email address of the user terminal 30 for private use, that is, from an email address that is not stored in the user information storage part 52, a response email message returned to the user terminal 30 includes a PIN code. Meanwhile, the inside user may have separately transmitted a print request email message from an email address stored in the user information storage part 52. In this case, with respect to the inside user, print data associated with the PIN code and print data associated with the username are stored in the storage server 60. In order to enable a printing process to be executed for both print data with a single logon operation, the username and password and the PIN code may be simultaneously entered.

When at least one of a username and password and a PIN code is entered on the logon screen 510 and an OK button 511 is depressed, in step S302, the authentication control part 221 determines whether a username and password are entered on the logon screen 510. If a username and password are entered (YES in step S302), in step S303, the authentication control part 221 performs authentication. For example, the authentication control part 221 transmits an authentication request in which the entered username and password are specified to the authentication server 50. The request response part 51 of the authentication server 50 determines whether the username and password combination specified in the authentication request is stored in the user information storage part 52. If the combination is stored in the user information storage part 52, the authentication succeeds. If the combination is not stored in the user information storage part 52, the authentication fails. The request response part 51 returns information indicating the success or failure of the authentication to the authentication control part 221 of the image forming apparatus 20, which has requested the authentication.

If it is determined in step S304 that the authentication has succeeded (YES in step S304), in step S305, the print information obtaining part 222 adds the username entered on the logon screen 510 to specified information. The specified information is information that is specified at the time of obtaining a print information list from the storage server 60 in subsequent step S308. In the case of an authentication failure (NO in step S304), step S305 is not executed.

In step S306, the print information obtaining part 222 determines whether a PIN code is entered on the logon screen 510. If a PIN code is entered (YES in step S306), in step S307, the print information obtaining part 222 adds the PIN code to the specified information. If no PIN code is entered (NO in step S306), step S307 is not executed.

Next, in step S308, the print information obtaining part 222 determines the specified information, and obtains a print information list (a list of pieces of print information) from the storage server 60. More specifically, the print information obtaining part 222 determines the specified information, and transmits a request for obtaining a print information list to the storage server 60. In response to the obtaining request, the print information providing part 63 of the storage server 60 obtains print information that contains the specified information determined (specified) in the obtaining request from the print information storage part 62 (FIG. 7). That is, when a username and a password are entered on the logon screen 510, print information whose user mode is "U" and which includes the username is obtained. When a PIN code is entered on the logon screen 510, print information whose user mode is "G" and which includes the PIN code is obtained.

When the username and password and the PIN code are entered on the logon screen 510 and the authentication succeeds, print information whose user mode is "U" and which includes the username and print information whose user mode is "G" and which includes the PIN code are obtained. When the username and password and the PIN code are entered on the logon screen 510 and the authentication fails, print information whose user mode is "G" and which includes the PIN code is obtained.

The print information providing part returns a list of the obtained print information (items) to the image forming apparatus 20. Here, the returned print information may not include print data.

Next, in step S309, the print information obtaining part 222 of the image forming apparatus 20 causes a list of job names included in the returned print information to be displayed on the operations panel 25. The list is a list of candidate print targets (objects of printing). That is, a user may enter a command to execute printing with respect to the print information included in the list.

When one or more job names are selected from the list, in step S310, the print information obtaining part 222 obtains print data corresponding to the job names from the storage server 60. More specifically, the print information obtaining part 222 transmits a request for obtaining print data in which the job names are specified to the storage server 60. In response to the obtaining request, the print information providing part 63 of the storage server 60 returns print data corresponding to the job names specified in the obtaining request to the image forming apparatus 20.

When the print information obtained with the entered username and/or PIN code corresponds to a single print data item alone, the print information obtaining part 222 may obtain the print data without execution of the process of step S309. Further, the print information providing part 63 may transmit the print data obtained with the username and/or PIN code to the image forming apparatus 20 instead of returning a list of print information.

Next, in step S311, the print control part 223 controls execution of print jobs related to the print data. As a result, paper on which the print data are printed is output.

As described above, according to the first embodiment, even an outside user whose account such as a username and password is not registered with the authentication server 50 may be provided with authority for printing. Accordingly, it is possible to reduce the necessity for an outside user to request an inside user to perform printing. Further, an outside user is informed of a PIN code with respect to each print request email message. Accordingly, it is possible to provide each outside user with a unique pseudo and temporary account. Accordingly, the print data that each outside user is allowed to manipulate are limited to those corresponding to print request mail from the outside user. As a result, it is possible to avoid the occurrence of a situation where outside users are allowed to easily manipulate each other's print data.

Further, it is also possible to reduce the necessity of installing an image forming apparatus 20 for the exclusive use of outside users.

When a single outside user transmits multiple print request email messages, multiple response email messages including respective different PIN codes are returned to the user terminal (FIG. 1) of the outside user. Taking such a situation into consideration, the logon screen 510 (FIG. 10) may be configured to allow entry of multiple PIN codes. The print information obtaining part 222 may be configured to obtain print information that includes one of the multiple PIN codes from the storage server 60. This makes it possible to eliminate the trouble of having to repeat logging on and displaying a print information list with respect to each PIN code.

Alternatively, the PIN code generation part 13 of the management server 10 may store a generated PIN code in correlation with the source (email) address of a print request email message in, for example, the secondary storage device 102. When the source address of a print request email message is stored in correlation with a PIN code in the secondary storage device 102, the PIN code generation part 13 outputs the stored PIN code instead of generating a new PIN code. In this case, a response email message including the stored PIN code is returned.

According to this, when a single outside user transmits multiple print request email messages, the outside user is assigned a single PIN code instead of being assigned a PIN code for each print request email message. Accordingly, it is possible for the outside user to cause the image forming apparatus 20 to display a list of print information corresponding to the multiple print request email messages and to perform printing by entering the single PIN code on the logon screen 510.

In the case of an outside user, a username is not specified. Therefore, it is difficult to identify a user who has performed printing although log information is recorded with respect to printing in the image forming apparatus 20. Therefore, the image forming apparatus 20 may place restrictions on the printing of print data pertaining to print information obtained by specifying a PIN code. For example, the image forming apparatus 20 may set the upper limit to the number of paper sheets to be printed or disable color printing. This makes it possible to prevent a large amount of printing that takes advantage of anonymity.

Further, the PIN code may be provided with an expiration date. A PIN code that is past its expiration date may be invalidated.

Further, an email address that is the source address of a print request email message and is not stored in the user information storage part 52 may be recorded in log information instead of a username. The inclusion of information that enables identification of an individual, such as an email address, in log information is expected to have a psychological deterrent effect on a large amount of printing that takes advantage of anonymity.

Next, a description is given of a second embodiment. In the second embodiment, a description is given of differences from the first embodiment. Accordingly, the second embodiment may be the same as the first embodiment where no particular reference is made.

According to the second embodiment, a description is given of the case where the functions of the management server 10, the authentication server 50, and the storage server 60 are provided via the Internet like a cloud service. Accordingly, in the second embodiment, the user terminal 30 and the mail server 40 are connected to the management server 10 via the Internet and the image forming apparatus 20 is connected to the authentication server 50 and the storage server 60 via the Internet.

Figure 11:
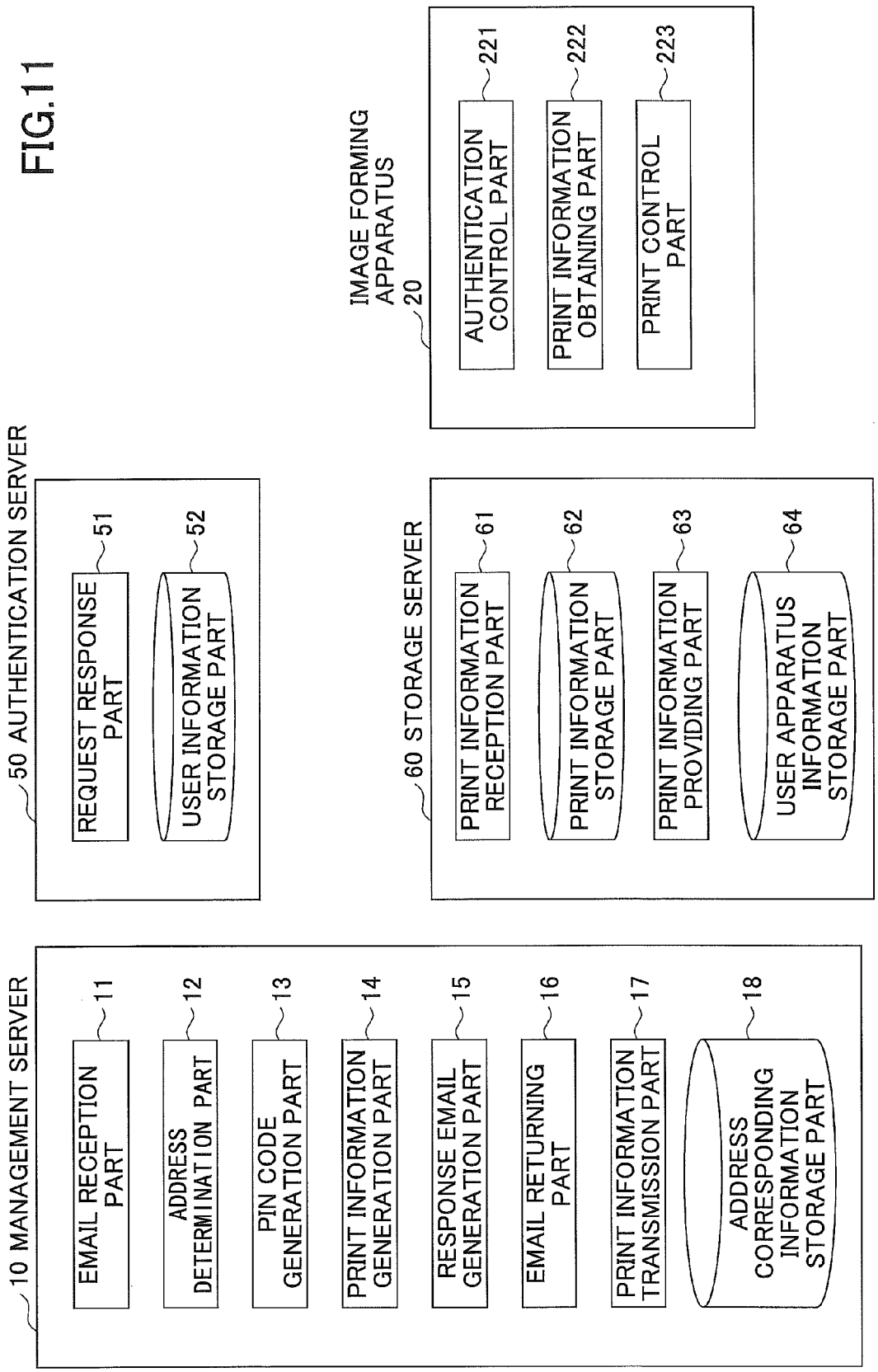
FIG. 11 is a diagram illustrating a functional configuration of a printing system according to a second embodiment.

FIG. 11 is a diagram illustrating a functional configuration of a printing system according to the second embodiment. Referring to FIG. 11, the management server 10 further includes an address corresponding information storage part 18 (in addition to the configuration illustrated in FIG. 4). The address corresponding information storage part 18 stores (contains) an email address for the management server 10 assigned to each corporate user (company). The address corresponding information storage part 18 may be implemented using, for example, the secondary storage device 102 or a storage device connected to the management server 10 via a network.

The storage server 60 further includes a user apparatus information storage part 64 (in addition to the configuration illustrated in FIG. 4). The user apparatus information storage part 64 stores the identification information (hereinafter referred to as "apparatus ID") of each of the image forming apparatuses 20 installed in each corporate user.

A procedure for a process for storing print data in the second embodiment may be basically the same as that of FIG. 5 except for some of the steps. Specifically, in step S101, the user terminal 30 transmits a print request email message to an email address for the management server 10 assigned to a corporate user to which the image forming apparatus 20 that is a printing destination (where printing is to be performed) belongs (for which the image forming apparatus 20 is installed).

The email reception part 11 of the management server 10 determines a corporate user whose image forming apparatus 20 should be determined as a printing destination based on the email address at which the print request email message is received (the email address determined as a destination address). The address corresponding information storage part 18 is used in this determination.

FIG. 12 is a diagram illustrating a configuration of an address corresponding information storage part according to the second embodiment. Referring to FIG. 12, the address corresponding information storage part 18 stores a company code and a receiving email address for reception for each corporate user.

The company code is identification information assigned to each corporate user. The receiving address is an email address for the management server 10 assigned to a corporate user. To the management server 10, the receiving address is an email address for receiving a print request email message from a corporate user corresponding to the receiving address.

The email reception part 11 stores a company code corresponding to an email address at which a print request email message is received in, for example, the memory unit 103.

In the print information generating process of step S106 (FIG. 5), the print information generation part 14 generates print information that further includes a company code stored in the memory unit 103. Accordingly, in step S109, the print information including the company code is transmitted to the storage server 60. Upon the reception of the print information, in step S110 (FIG. 5), the print information reception part 61 of the storage server 60 stores the print information in the print information storage part 62.

FIG. 13 is a diagram illustrating a configuration of a print information storage part according to the second embodiment. Referring to FIG. 13, in the second embodiment, the print information storage part 62 further stores a company code with respect to each print data. Alternatively, the print information storage part 62 may be provided one for each company code.

Thereafter, a user who has transmitted the print request email message goes to a location where the image forming apparatus 20 is installed, and operates the image forming apparatus 20. Next, a description is given of a procedure for a process that the image forming apparatus 20 executes in response to a user's operation.

In the second embodiment, a procedure for a process executed by the image forming apparatus 20 may be the same as illustrated in FIG. 9 except for some of the steps. Specifically, in step S308, the print information obtaining part 222 determines the specified information that further includes a company code and an apparatus ID, and transmits a request for obtaining a print information list (a print information list obtaining request) to the storage server 60. The apparatus ID is the apparatus ID of the image forming apparatus 20, and is contained in, for example, the ROM 213, the NVRAM 215 or the HDD 214 of the image forming apparatus 20. The company code is the company code of a company where the image forming apparatus 20 is installed, and is preset in the image forming apparatus 20, for example. The set company code is stored in, for example, the NVRAM 215 or the HDD 214.

The apparatus ID may be retained by, for example, a particular application installed in the image forming apparatus 20. In this case, the image forming apparatus 20 in which the particular application is installed may be identified by the apparatus ID. That is, according to this embodiment, an application identifier retained by a particular application may be used as the apparatus ID if the application identifier enables the image forming apparatus 20 to be identified as a particular image forming apparatus.

The print information providing part 63 of the storage server 60 determines whether a combination of the company code and the apparatus ID included in the specified information specified in the obtaining request is stored in the user apparatus information storage part 64.

FIG. 14 is a diagram illustrating a configuration of a user apparatus information storage part. As illustrated in FIG. 14, the user apparatus information storage part 64 stores, with respect to each image forming apparatus 20 installed in a corporate user, the company code of the corporate user and the apparatus ID of the image forming apparatus 20 in correlation with each other.

If the combination of the company code and the apparatus ID included in the specified information specified in the print information list obtaining request is not stored in the user apparatus information storage part 64, the print information providing part 63 returns no print information list. This is because in this case, the legitimacy of the image forming apparatus 20 that has transmitted the obtaining request is challengeable. In this embodiment, the legitimacy of the image forming apparatus 20 refers to the installation of the image forming apparatus 20 in a proper corporate user.

If the combination of the company code and the apparatus ID included in the specified information specified in the obtaining request is stored in the user apparatus information storage part 64, the print information providing part 63 obtains print information including the specified information specified in the obtaining request from the print information storage part 62 (FIG. 13). That is, according to the second embodiment, print information that further includes the same company code as that included in the specified information is obtained. The print information providing part 63 returns a list of the obtained print information to the image forming apparatus 20.

When there is no need to verify the legitimacy of the image forming apparatus 20, the specified information specified in a request for obtaining a print information list may not include a company code. The print information providing part 63 may identify a company code corresponding to an apparatus ID based on the apparatus ID included in the specified information and the user apparatus information storage part 64, and use the company code in obtaining print information from the print information storage part 62.

As described above, according to the second embodiment, the email address for the management server 10 differs between corporate users. Further, a company code is specified with respect to a request for obtaining a print information list from the image forming apparatus 20, and a list of print information including the company code is returned to the image forming apparatus 20. Accordingly, it is possible to prevent the occurrence of an inconvenience such as print information corresponding to a print request email message transmitted from a company becoming available for printing for a user having the same username in another company.

When the source address of a print request email message is the email address of an inside user of a corporate user, it is possible to determine (specify) the company code of the corporate user from the email address by managing information on the correspondence between the email addresses of inside users and company codes. Accordingly, in the case of considering use only by inside users, the email address for the management server 10 may not be provided for each corporate user.

However, if the source address of a print request email message is the email address of an outside user (hereinafter referred to "user X"), there is no company code corresponding to the email address. Accordingly, there is no way to identify a company code that is a printing destination with respect to the print request email message.

If no company code is specified so that print information that includes no company code is stored in the storage server 60, and the matching of company codes is not a condition in obtaining print information corresponding to a request for obtaining a print information list, it is possible for the user X to perform printing from any company. In order to prevent the occurrence of such a situation, the email address for the management server 10 differs between corporate users and a company code is specified in a request for obtaining a print information list so that a list of print information including the company code is returned in the second embodiment.

The email address for the management server 10 of each corporate user may be used as the above-described company code. In this case, the user apparatus information storage part 64 is not always necessary. Print information is stored in the storage server 60 with the email address included in the print information. The email address is prestored in the image forming apparatus 20. The image forming apparatus 20 transmits a request for obtaining a print information list in which the email address as well as an apparatus ID is specified to the storage server 60. The storage server 60 returns a list of print information that includes the email address specified in the obtaining request.

According to this configuration as well, it is possible to produce the same effects as described above.

Next, a description is given of a third embodiment. In the third embodiment, a description is given of difference from the first and the second embodiment. Accordingly, the third embodiment may be the same as the first or second embodiment where no particular reference is made.

In the third embodiment, a description is given of a variation of the process that is executed at the time of user authentication in the image forming apparatus 20.

In the first embodiment, a description is given of the case where a username and password (ID) or a PIN code is entered through the logon screen 510. In this case, a user enters such information using a software keyboard or the like. In the third embodiment, in order to reduce such an operational load, the image forming apparatus 20 includes a contactless card reader. A user uses a portable user terminal (user terminal 30) that includes the same IC chip as IC cards. For example, a username and a password are stored (contained) in a storage part of the user terminal 30. Further, in the user terminal 30, an application is implemented that reads the username and password from the storage part and transmits the username and password to the image forming apparatus 20 via the card reader when the user terminal 30 is placed over the card reader of the image forming apparatus 20. The authentication control part 221 of the image forming apparatus 20 performs authentication using the username and password received via the card reader.

According to the above-described configuration, an inside user may be authenticated by simply placing her/his user terminal 30 over the image forming apparatus 20.

Further, if the user of the user terminal 30 is an outside user, a response email message including a PIN code is returned in response to a print request email message transmitted from the user terminal 30, and is stored in the storage part of the user terminal 30. When the user terminal 30 is placed over the card reader of the image forming apparatus 20, the above-described application may search for an email message whose source address is a predetermined email address in the user terminal 30, and if there is an email message that meets such a condition, the application may transmit a PIN code included in the email message to the image forming apparatus 20 via the card reader. The print information obtaining part 222 of the image forming apparatus 20 may obtain print information by specifying the PIN code received via the card reader.

According to the above-described configuration, an outside user may view a list of print information correlated with a PIN code assigned to the outside user by simply placing the user terminal 30 of the outside user over the image forming apparatus 20.

Further, when a username and password and a PIN code are both stored in the user terminal 30, the image forming apparatus 20 may obtain both of the username and the PIN code and obtain print information corresponding to the username and print information corresponding to the PIN code.

In the above-described embodiments, a description is given, taking printing by the image forming apparatus 20 as an example. However, the present invention may be applied not only to printing but also to outputting such as projection of image data by a projector. That is, the present invention may be applied by replacing data to be printed with data to be output by, for example, displaying by a terminal and projection by a projector.

Further, in the above-described embodiments, a description is given, taking transmission of print target data by email as an example. Alternatively, print target data may be transmitted to the management server 10 by a communication method other than email. In this case, the management server 10 receives print target data or print target data and a username from the user terminal 30. If the received username is not stored in the user information storage part 52 or no username is received, the management server 10 generates a PIN code and transmits the PIN code to the user terminal 30.

Further, when a company code is managed as in the second embodiment, the management server 10 receives print target data and a username or print target data and a company code from the user terminal 30. If no company code is received or no company code matching the received company code is stored in the management server 10, the management server 10 transmits, to the user terminal 30, a notification to the effect that the printing of print target data is not authorized. If there is a matching company code and the received username is not stored in the user information storage part 52 or no username is received, the management server 10 generates a PIN code and transmits the PIN code to the user terminal 30.

In the above-described embodiments, the management server 10 and the storage server 60 may be implemented by a single computer. Alternatively, the management server 10, the storage server 60, and the authentication server 50 may be implemented by a single computer. Further, the functions of the management server 10, the storage server 60, and the authentication server 50 may be implemented in the image forming apparatus 20.

Alternatively, each of the management server 10, the storage server 60, and the authentication server 50 may be implemented by multiple separate computers.

Further, in the above-described embodiments, a description is given of the case where print data are generated in the management server 10. However, print data related to electronic data attached to a print request email message may be generated in any of the user terminal 30, the management server 10, the storage server 60, and the image forming apparatus 20.

Next, a description is given of a fourth embodiment. In the fourth embodiment, a description is given of a variation of the second embodiment.

Figure 15:
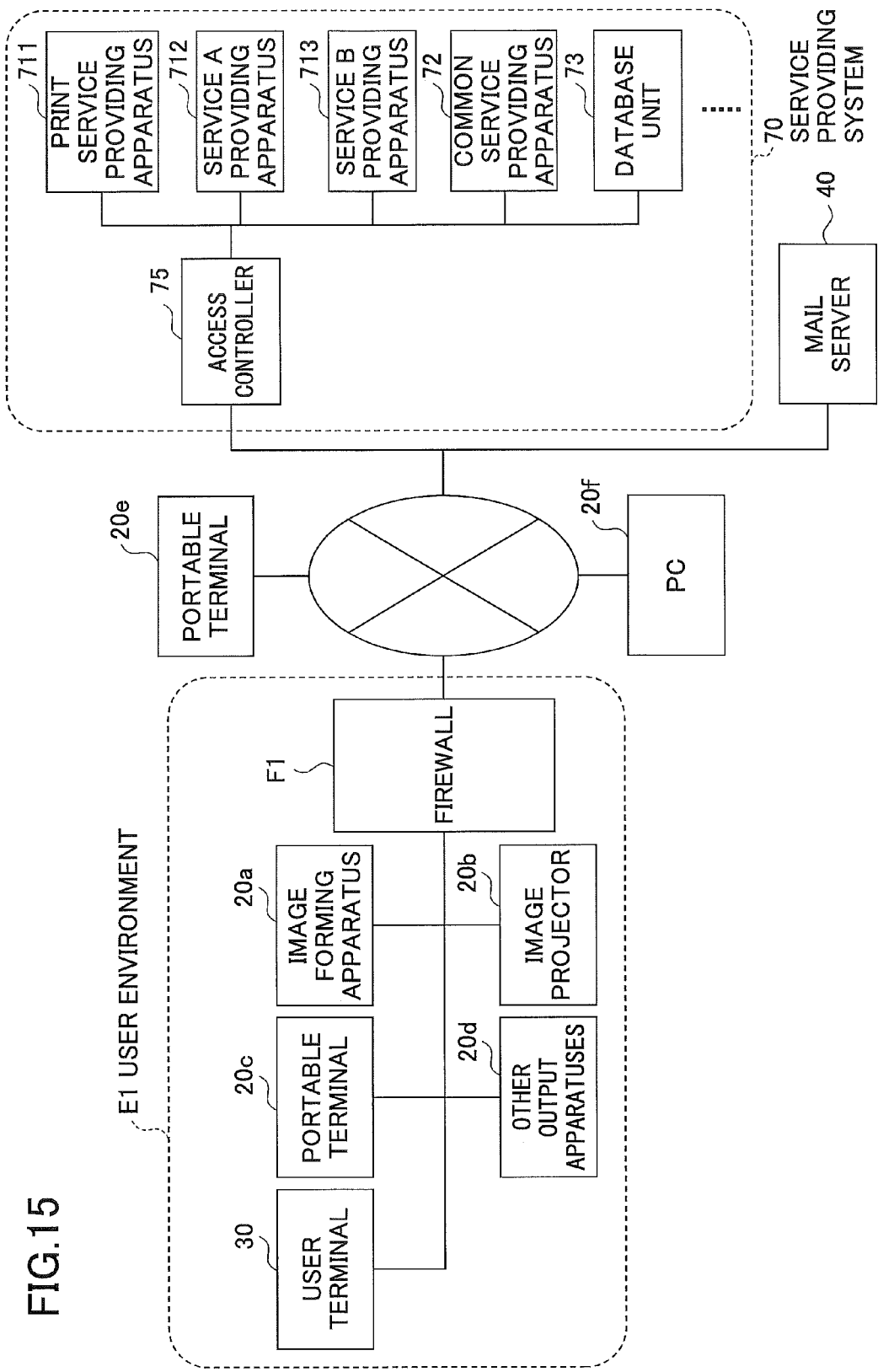
FIG. 15 is a diagram illustrating a system configuration according to a fourth embodiment.

FIG. 15 is a diagram illustrating a system configuration in the fourth embodiment. In FIG. 15, parts of the system that serve the same as in FIG. 1 are referred to by the same reference numerals, and their description is omitted. In FIG. 15, a service providing system 70 and a user environment E1 may communicate with each other via a wide area network such as the Internet.

The service providing system 70 is a computer system that provides a cloud service via a network. In this embodiment, a description is given, taking a cloud service as a specific example. However, this embodiment may also be applied to various kinds of services provided via a network, such as services provided by application service providers (ASPS) and Web services.

The service providing system 70 includes, for example, an access controller 75, a print service providing apparatus 711, a service A providing apparatus 712, a service B providing apparatus 713, a common service providing apparatus 72, and a database unit 73, each of which may be implemented by a single computer.

The access controller 75 is an apparatus that controls external access to computers and performs load balancing on computers inside the service providing system 70.

The print service providing apparatus 711 is one or more computers that control a process for providing a cloud print service. The cloud print service refers to a service that allows print data to be uploaded to a cloud environment (the service providing system 70 in this embodiment) and to be printed by an image forming apparatus 20a as required.

Each of the service A providing apparatus 712 and the service B providing apparatus 713 is an example illustration of a group of computers that provide services other than the cloud print service.

The common service providing apparatus 72 is one or more computers in which functions are implemented that are common to or used by two or more of apparatuses that directly provide particular services via a network, such as the print service providing apparatus 711, the service A providing apparatus 712, the service B providing apparatus 713, etc.

The database unit 73 is one or more computers that operate as various kinds of storage parts or is a storage device.

The user environment E1 is a system environment in an organization such as a corporate user that is an example user of the service providing system 70. The user environment E1 illustrated in FIG. 15 includes the image forming apparatus 20a, an image projector 20b, a portable terminal 20c, other output apparatuses 20d, and the user terminal 30, all of which are interconnected by a network (either wired or wireless) such as a local area network (LAN).

The image forming apparatus 20a is the image forming apparatus 20 in the second embodiment.

The image projector 20b is, for example, a projector, and projects image data. Examples of the portable terminal 20c include a personal digital assistant (PDA), a tablet terminal, a smartphone, and a cellular phone. The other output apparatuses 20d are various kinds of output apparatuses other than the image forming apparatus 20a, the image projector 20b, and the portable terminal 20c.

The user environment E1 further includes a firewall F1. The firewall F1 may be the same as a common firewall. The firewall F1 blocks requests from outside the user environment E1, for example.

The service providing system 70 is also accessible from environments other than the user environment E1. For example, the service providing system 70 may be accessed from, for example, a portable terminal 20e or a PC 20f via the Internet. The portable terminal 20e and the PC 20f may also be used in the user environment E1.

Figure 16:
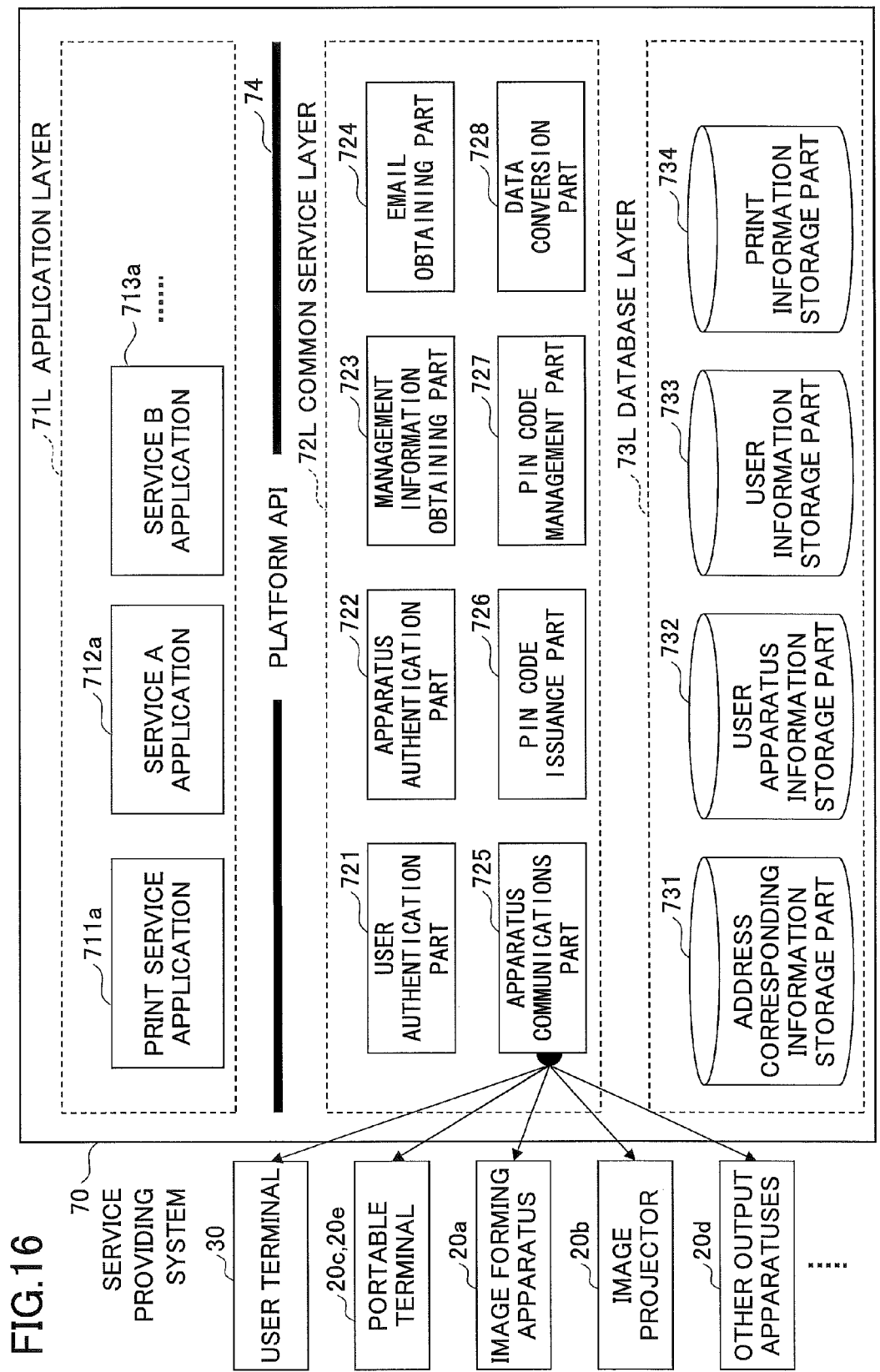
FIG. 16 is a diagram illustrating a functional configuration of a service providing system according to the fourth embodiment.

FIG. 16 is a diagram illustrating a functional configuration of a service providing system according to the fourth embodiment. In FIG. 16, functions of the service providing system 70 are classified into layers including an application layer 71L, a common service layer 72L, and a database layer 73L.

The application layer 71 is a layer where server side applications (hereinafter referred to as "server applications") that associate with apparatuses such as the image forming apparatus 20a are implemented. In FIG. 16, the application layer 71L includes server applications such as a print service application 711a, a service A application 712a, and a service B application 713a.

The print service application 711a is a server application related to a cloud print service. In this embodiment, the print service application 711a is implemented in the print service providing apparatus 711. The service A application 712a and the service B application 713a are example illustrations of other service applications. In this embodiment, the service A application 712a and the service B application 713a are implemented in the service A providing apparatus 712 and the service B providing apparatus 713, respectively.

The common service layer 72L is a layer that includes functions common to multiple service applications or basic functions used by multiple server applications, and is implemented in the common service providing apparatus 72. Functions of the common service layer 72L may be called via a platform API 74. The platform API 74 is basically called from server applications in the application layer 71L. The platform API 74 may be disclosed to those other than an operator of the service providing system 70, such as third vendors. In this case, server applications may be implemented by the third vendors. That is, server applications are suitably developed and added using the platform API 74.

In FIG. 16, the common service layer 72L includes a user authentication part 721, an apparatus authentication part 722, a management information obtaining part 723, an email obtaining part 724, an apparatus communications part 725, a PIN code issuance part 726, a PIN code management part 727, and a data conversion part 728.

The user authentication part 721 performs user authentication. The apparatus authentication part 722 performs authentication on the correspondence relationship among the image forming apparatus 20a, a user, and an organization. The organization is a concept that includes the "company" in the above-described embodiments and other corporations. In the fourth embodiment, identification information corresponding to the "company code" in the second embodiment is referred to as an "organization code." Accordingly, the authentication of the correspondence relationship among the image forming apparatus 20a, a user, and an organization is a process that includes verifying whether the user and the image forming apparatus 20a belong to the organization.

The management information obtaining part 723 obtains information stored in the database layer 73L in response to, for example, a request from the application layer 71L. The email obtaining part 724 obtains (receives) an email message stored in the mail server 40 in accordance with a protocol such a post office protocol (POP). The apparatus communications part 725 performs communications with apparatuses. The PIN code issuance part 726 issues (generates) a PIN code. The PIN code management part 727 manages the correlation between PIN codes and organization codes. The data conversion part 728 converts data format. In this embodiment, the data conversion part 728 generates print data based on print target data.

Server applications in the application layer 71L and parts in the common service layer 72L are implemented by processes that computers of the service providing system 70 are caused to execute by respective one or more programs installed in the computers.

The database layer 73L is a layer including a database (storage part) that stores (contains) various kinds of information, and is implemented using the database unit 73. In FIG. 16, the database layer 73L includes an address corresponding information storage part 731, a user apparatus information storage part 732, a user information storage part 733, and a print information storage part 734.

The address corresponding information storage part 731 has the same configuration as the address corresponding information storage part 18 (FIG. 12). The user apparatus information storage part 732 has the same configuration as the user apparatus information storage part 64 (FIG. 14). The user information storage part 733 has substantially the same configuration as the user information storage part 52 (FIG. 6). A description is given below of a difference between the user information storage part 733 and the user information storage part 52. The print information storage part 734 has the same configuration as the print information storage part 62 (FIG. 13).

The form of classification of software and storage parts illustrated in FIG. 16 is one example. The software and storage parts of the service providing system 70 do not have to be hierarchically classified as illustrated in FIG. 16 in order to implement this embodiment. That is, the hierarchical relationship between software and storage parts in the service providing system 70 is not limited to particular relationships as long as the hierarchical relationship allows the same processing procedure as in this embodiment to be executed.

Figure 17:
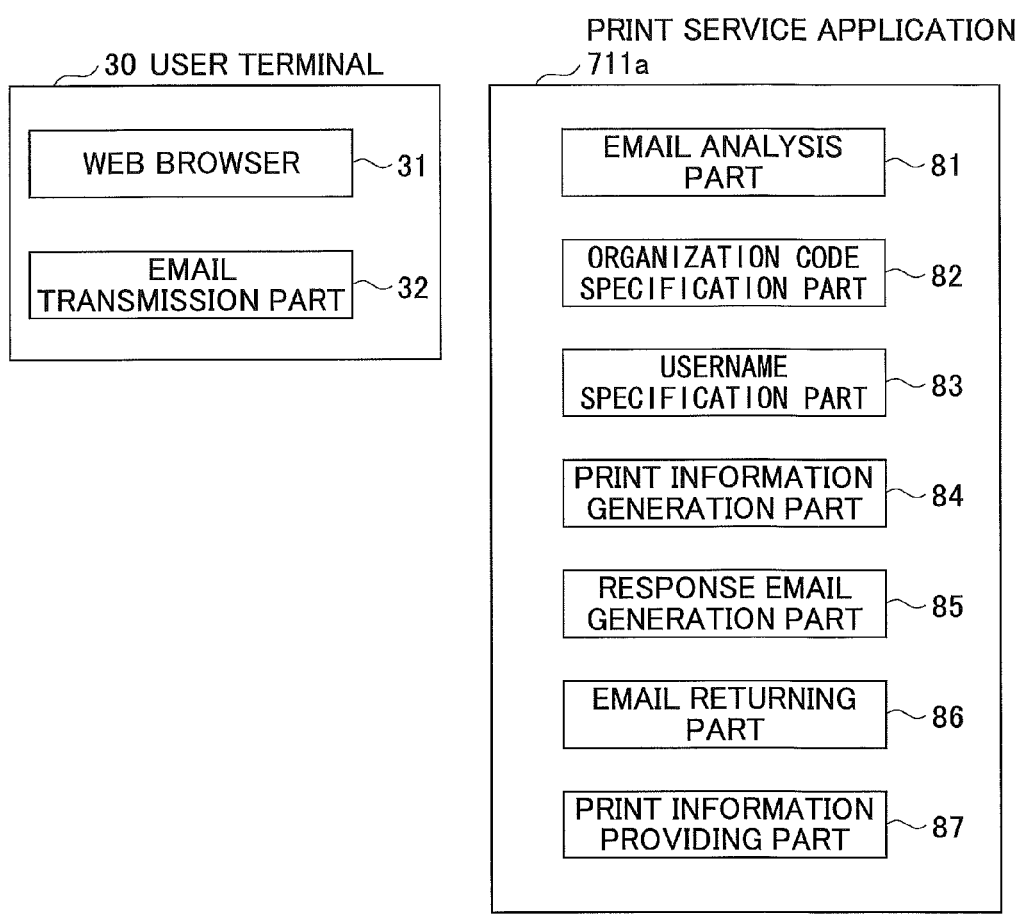
FIG. 17 is a diagram illustrating a functional configuration of a user terminal and a functional configuration of a print service application according to the fourth embodiment.

FIG. 17 is a diagram illustrating a functional configuration of a user terminal and a functional configuration of a print service application according to the fourth embodiment.

Referring to FIG. 17, the user terminal 30 includes a Web browser 31 and an email transmission part 32. The Web browser 31 is a common Web browser. The email transmission part 32 transmits email messages. In this embodiment, the email transmission part 32 transmits a print request email message. The email transmission part 32 is implemented by a process that the user terminal 30 is caused to execute by a program called a "mailer" (email software).

The print service application 711a includes an email analysis part 81, an organization code specification part 82, a username specification part 83, a print information generation part 84, a response email generation part 85, an email returning part 86, and a print information providing part 87.

The email analysis part 81 analyzes a print request email message and extracts information including print target data from the print request email message. The organization code specification part 82 specifies an organization code corresponding to the destination address of a print request email message. The username specification part 83 specifies a username corresponding to the source address of a print request email message. The functions of the print information generation part 84, the response email generation part 85, the email returning part 86, and the print information providing part 87 are the same as the functions of the print information generation part 14, the response email generation part 15, the email returning part 16, and the print information providing part 63, respectively, of FIG. 11.

A description is given below of a procedure for a process executed in the fourth embodiment. First, an overview is given, using a flowchart, of a processing procedure according to the fourth embodiment.

Figure 18:
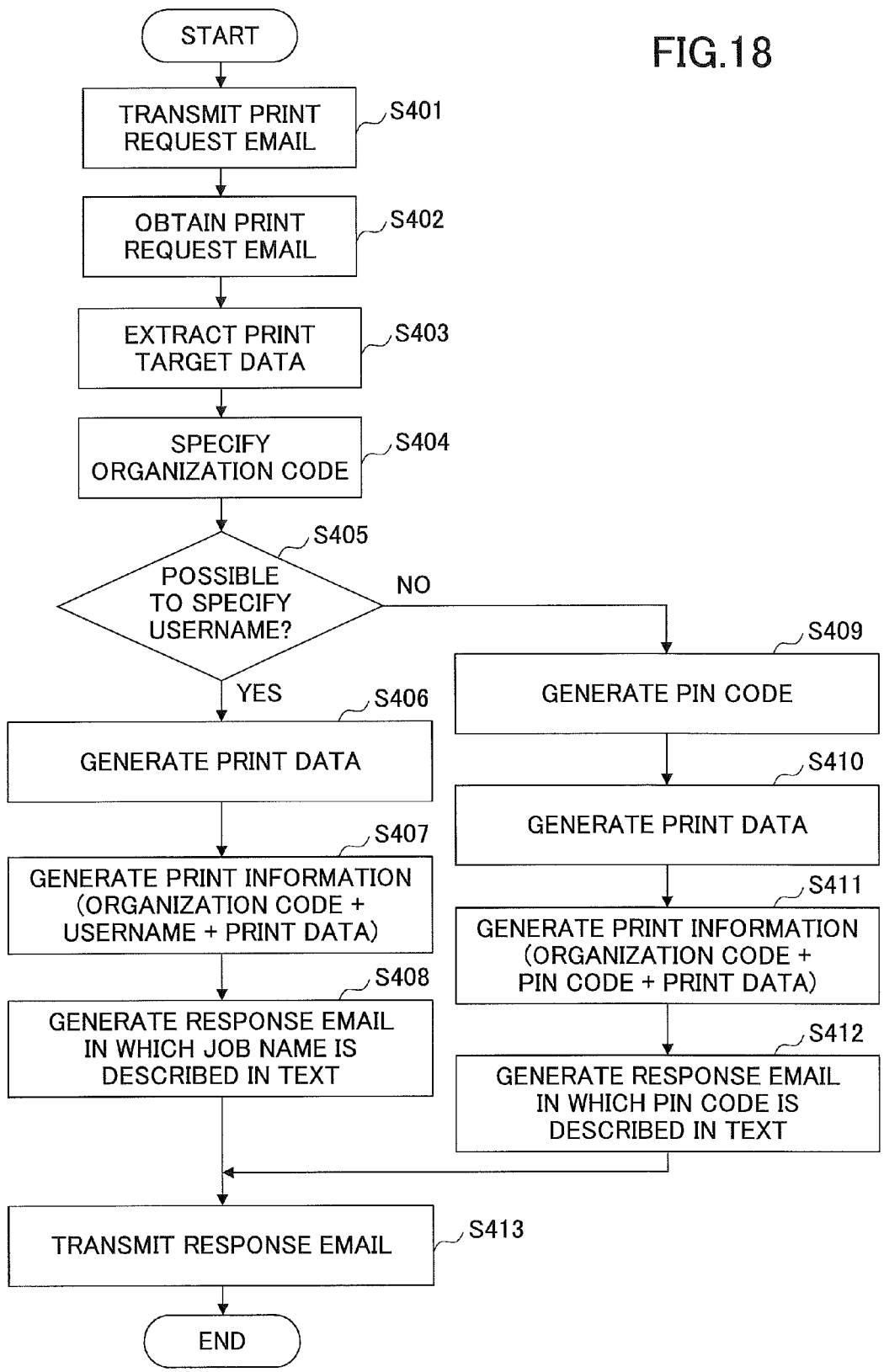
FIG. 18 is a flowchart for illustrating a procedure for a process for registration of print information using a print request email message according to the fourth embodiment.

FIG. 18 is a flowchart for illustrating a procedure for a process for registration (storage) of print information using a print request email message.

In step S401, in response to a user's input of a command, the email transmission part 32 of the user terminal 30 transmits a print request email message to an email address assigned to an organization where the user is located. The contents of the print request email address are the same as described in the above-described embodiments.

Next, in step S402, the email obtaining part 724 of the service providing system 70 obtains the print request email message from the mail server 40. Next, in step S403, the email analysis part 81 of the print service application 711a extracts print target data from the print request email message. Next, in step S404, the organization code specification part 82 of the print service application 711a specifies an organization code corresponding to the print request email message based on the destination address of the print request email message and the address corresponding information storage part 731. That is, the organization code specification part 82 obtains an organization code stored in correlation with the destination address in the address corresponding information storage part 731. In the fourth embodiment, the address corresponding information storage part 731 may have the same configuration as the address corresponding information storage part 18 (FIG. 12). However, the "company code" of the address corresponding information storage part 18 is replaced with the "organization code."

Next, in step S405, the username specification part 83 of the print service application 711a determines whether it is possible to specify a username based on the source address of the print request email message. Specifically, the username specification part 83 determines whether the source address is stored in correlation with the organization code specified (identified) in step S404 (hereinafter referred to as "target organization code") in the user information storage part 733.

Figure 19:
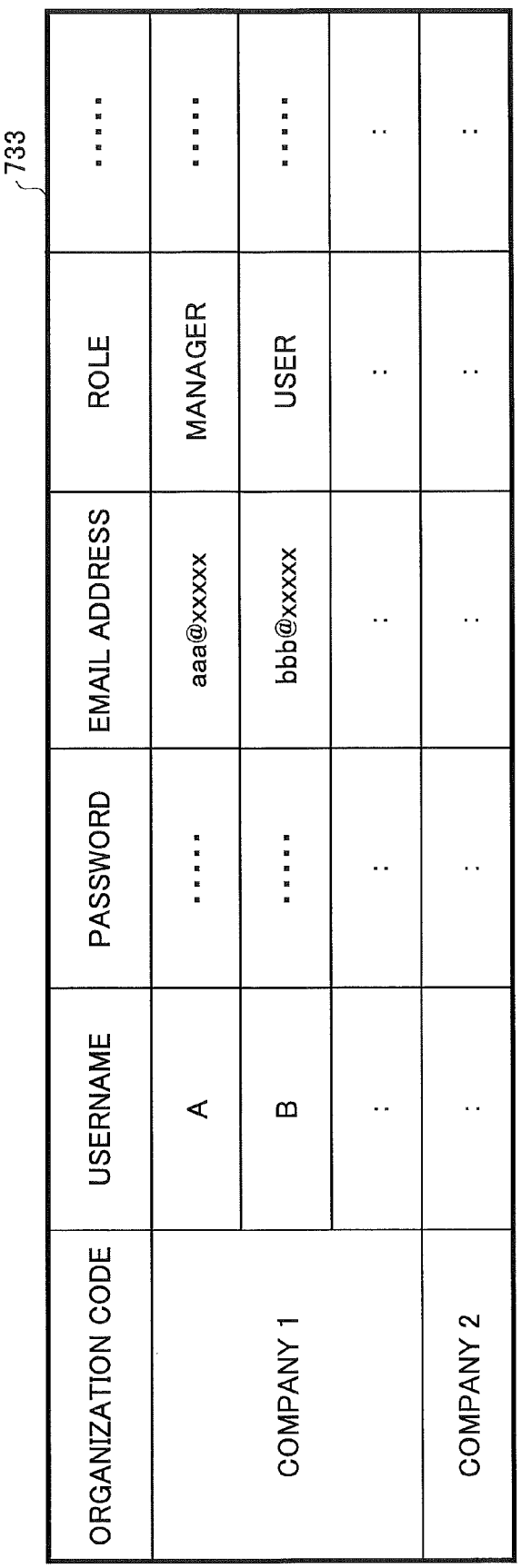
FIG. 19 is a diagram illustrating a configuration of a user information storage part according to the fourth embodiment.

FIG. 19 is a diagram illustrating a configuration of a user information storage part according to the fourth embodiment. Referring to FIG. 19, the user information storage part 733 includes the items of an organization code and a role in addition to the items of the user information storage part 52 (FIG. 6).

The role is information for determining whether a user is a manager or a general user. A manager is, for example, a person who manages apparatuses associated with the service providing system 70, such as the image forming apparatus 20a. The manager performs, for example, operations for associating the image forming apparatus 20a and the service providing system 70 with each other. A general user is a user who uses services provided by the service providing system 70.

In step S405, the presence or absence of user information including the target organization code and the source address is determined among the user information stored in the user information storage part 733. If the presence of such user information is determined, a username included in the user information (hereinafter referred to as "target username") is specified (identified).

When the target username is specified (YES in step S405), in step S406, the data conversion part 728 of the service providing system 70 generates print data with respect to the print target data. If the print target data are in such format as to be printable without conversion, print data may not be generated.

Next, in step S407, the print information generation part 84 generates print information. The print information includes a job name, the target organization code, the target username, and the print data. The print information generation part 84 stores the generated print information in the print information storage part 734.

Next, in step S408, the response email generation part 85 of the print service application 711a generates a response email message. The response email message includes, for example, the job name. Next, in step S413, the email returning part 86 transmits the response email message to the source address of the print request email message.

Meanwhile, if no username is specified in step S405 (NO in step S405), in step S409, the PIN code issuance part 726 of the service providing system 70 generates a PIN code. In step S410 and its subsequent steps, the same process as in step S407 and its subsequent steps is executed except that the print information generated in step S411 includes a job name, the target organization code, the PIN code, and the print data and that a response email message including the PIN code and the job name is generated in step S412.

Next, a description is given of the case of registering (storing) print information via the Web browser 31 of the user terminal 30. That is, according to the fourth embodiment, print information may be registered (stored) using a method other than the print request email.

Figure 20:
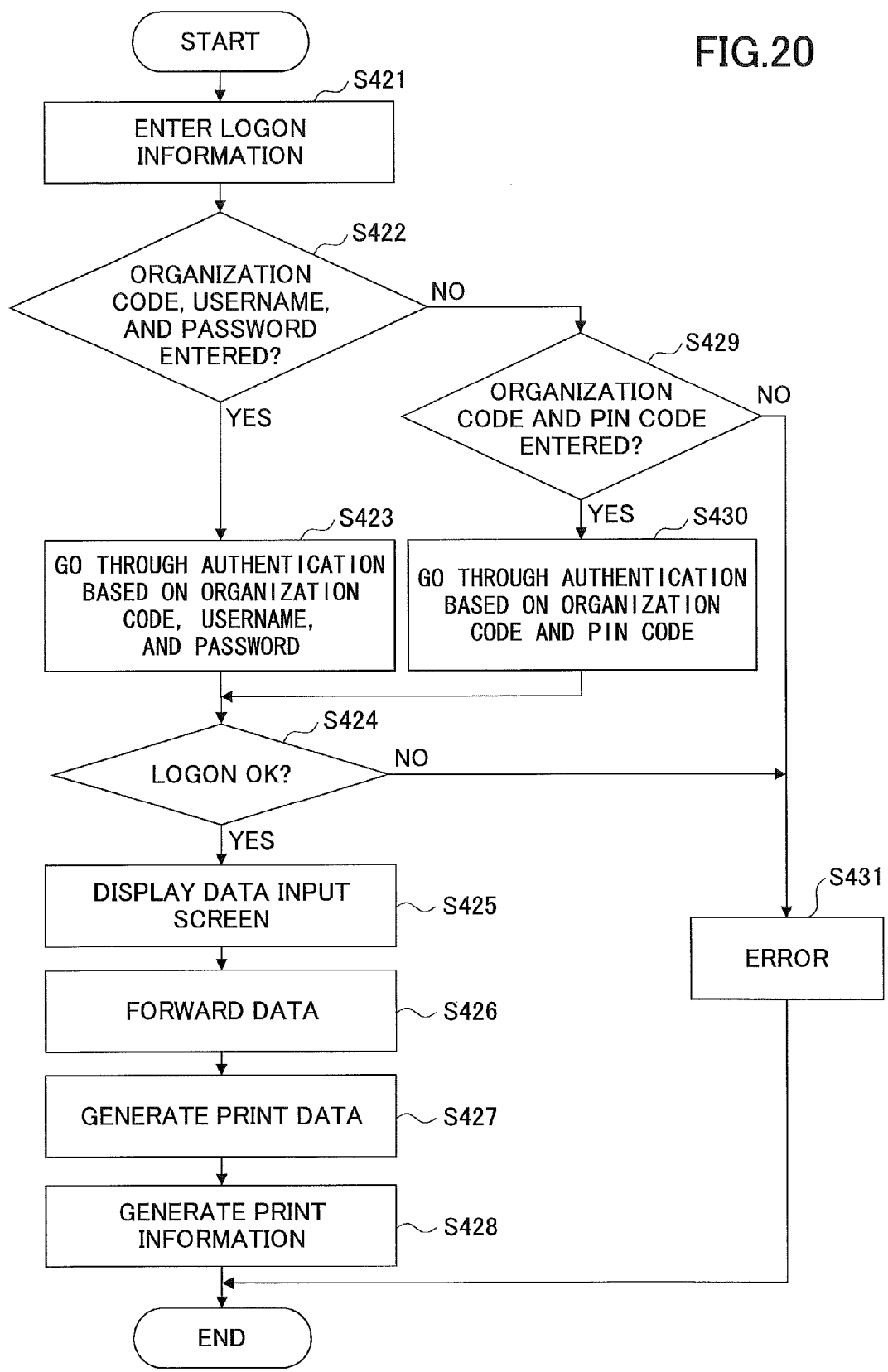
FIG. 20 is a flowchart for illustrating a procedure for a process for regeneration of print information using a Web interface according to the fourth embodiment.

FIG. 20 is a flowchart for illustrating a procedure for a process for regeneration of print information using a Web interface. It is assumed that a logon screen for logging on to the service providing system 70 is displayed on the Web browser 31 of the user terminal 30 in the initial state of FIG. 20.

In step S421, the Web browser 31 receives a user's input of logon information through the logon screen.

Figure 21:
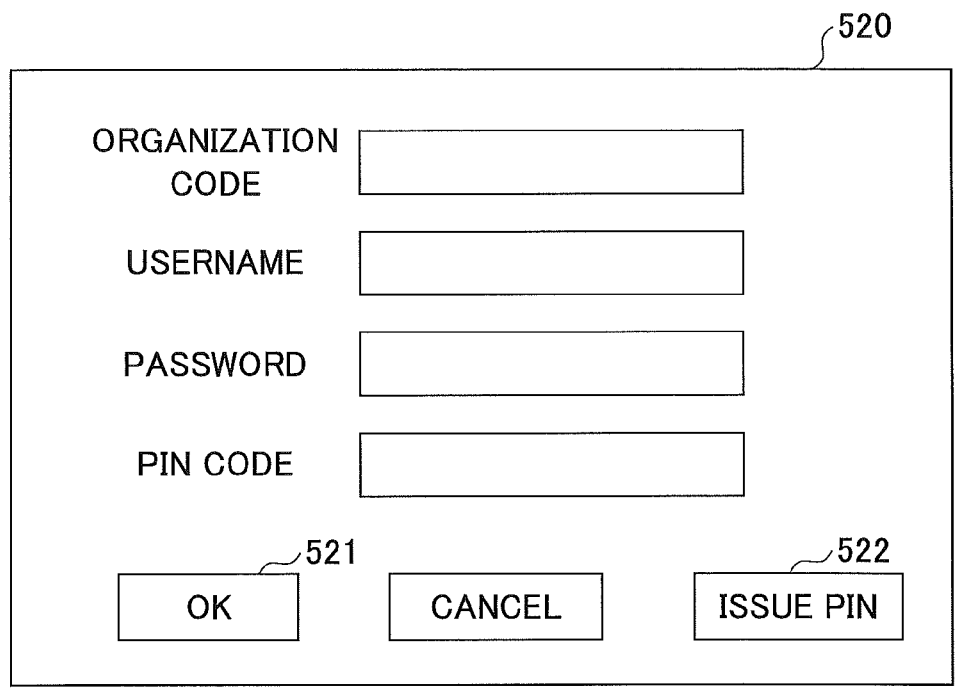
FIG. 21 is a diagram illustrating an example display of a logon screen displayed on a user terminal according to the fourth embodiment.

FIG. 21 is a diagram illustrating an example display of a logon screen displayed on a user terminal according to the fourth embodiment. Referring to FIG. 21, a logon screen 520 includes fields for entering an organization code, a username, a password, and a PIN code. The logon screen 520 further includes an OK button 521 and a PIN issuance button 522.

There are two logon patterns: Pattern 1 in which an organization code, a username, and a password are specified and Pattern 2 in which an organization code and a PIN code are specified. In the case of Pattern 2, a user has a PIN code issued in advance. The PIN issuance button 522 is a button to be depressed for the issuance of a PIN code. A description is given below of a procedure in the case where the PIN issuance button 522 is depressed.

When the OK button 521 of the logon screen 520 is depressed, in step S422, the Web browser 31 determines whether an organization code, a username, and a password have been entered on the logon screen 520. The process executed by the Web browser 31 is based on the definition of a Web page (hypertext markup language [HTML] data or the like) that causes the Web browser 31 to display the logon screen 520.

If it is determined that an organization code, a username, and a password have been entered on the logon screen 520 (YES in step S422), in step S423, the Web browser 31 goes through authentication by the service providing system 70 based on the organization code, username, and password. That is, the organization code, username, and password are transmitted to the user authentication part 721. The user authentication part 721 performs authentication based on whether a combination of the organization code, username, and password is stored in the user information storage part 733.

If the authentication succeeds and logon is authorized (YES in step S424), in step S425, the Web browser 31 causes a data input screen to be displayed. The data input screen is a screen for causing a print target file (a file to be printed) to be selected from the files stored in the user terminal 30. When a file is selected via the data input screen, in step S426, the data stored in the file are forwarded from the Web browser 31 to the service providing system 70.

When the service providing system 70 receives the forwarded data, in steps S427 and S428, the same process as in steps S406 and S407 of FIG. 18 is performed. As a result, print information including print data based on the forwarded data is stored in the print information storage part 734.

Meanwhile, if an organization code, a username, and a password are not entered on the logon screen 520 (NO in step S422), in step S429, the Web browser 31 determines whether an organization code and a PIN code are entered. If an organization code and a PIN code are entered (YES in step S429), in step S430, the Web browser 31 goes through authentication by the service providing system 70 based on the organization code and the PIN code. That is, the service providing system 70 performs authentication based on whether a combination of the organization code and the PIN code is registered with (stored in) the service providing system 70.

If the authentication succeeds and logon is authorized (YES in step S424), the Web browser 31 executes the process of step S425 and its subsequent steps. In this case, however, in step S428, the same process as in step S411 of FIG. 18 is executed. As a result, print information including the organization code and the PIN code is stored in the print information storage part 734.

If the pattern of input to the logon screen 520 (the logon pattern) is neither Pattern 1 nor Pattern 2 (NO in step S429) or in the case of a logon failure (NO in step S424), in step S431, the Web browser 31 causes an error screen to be displayed. In this case, no print information is registered.

Next, a description is given of a process for issuing a PIN code through a Web interface, which is executed at the time of going through authentication based on an organization code and a PIN code.

Figure 22:
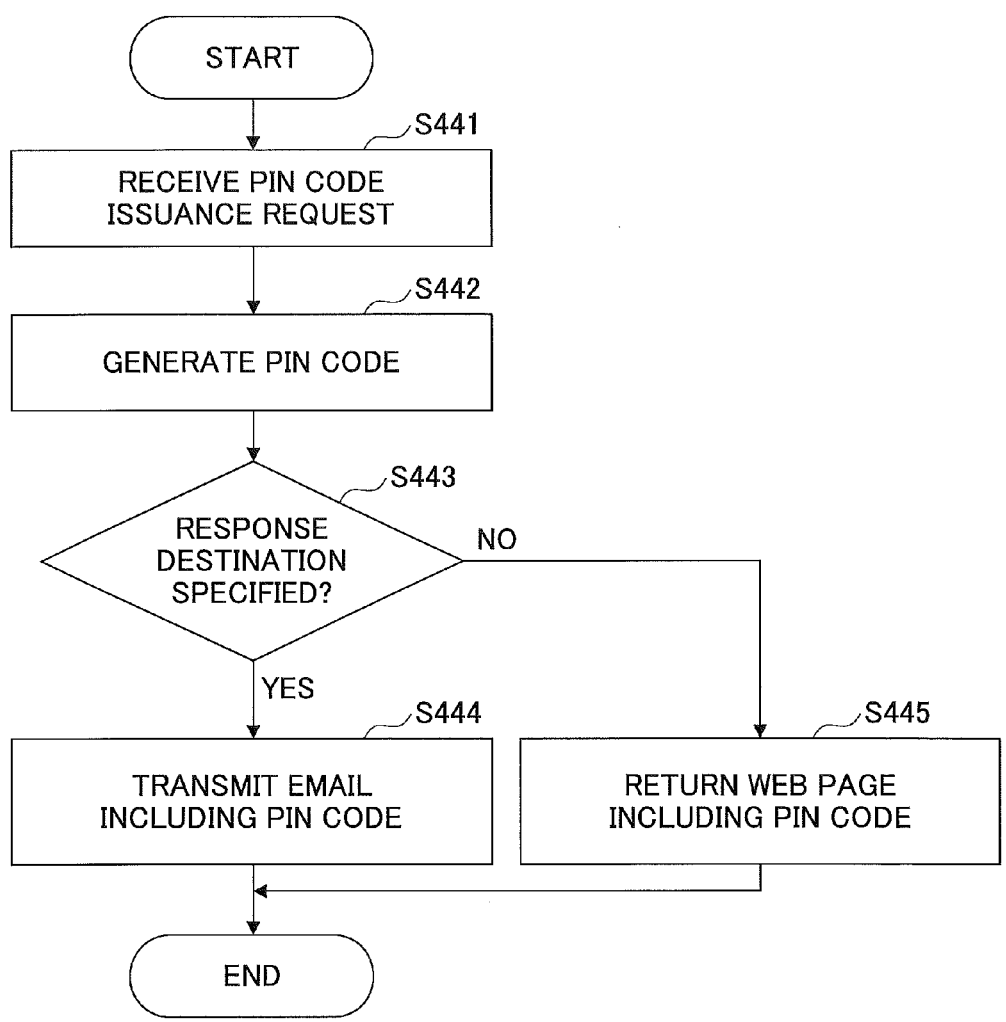
FIG. 22 is a flowchart for illustrating a procedure for a process for issuing a PIN code through a Web interface according to the fourth embodiment.

FIG. 22 is a flowchart for illustrating a procedure for a process for issuing a PIN code through a Web interface according to this embodiment. It is assumed that the logon screen 520 (FIG. 21) is displayed on the Web browser 31 of the user terminal 30 in the initial state of FIG. 22.

In step S441, the Web browser 31 receives a request for the issuance of a PIN code (a PIN code issuance request). The PIN code issuance request is received (accepted) in response to the depression of the PIN issuance button 522 after an organization code is entered on the logon screen 520. In response to the depression of the PIN issuance button 522, the Web browser 31 may display a response destination address specifying screen as illustrated in FIG. 23.

Figures 23, 24:
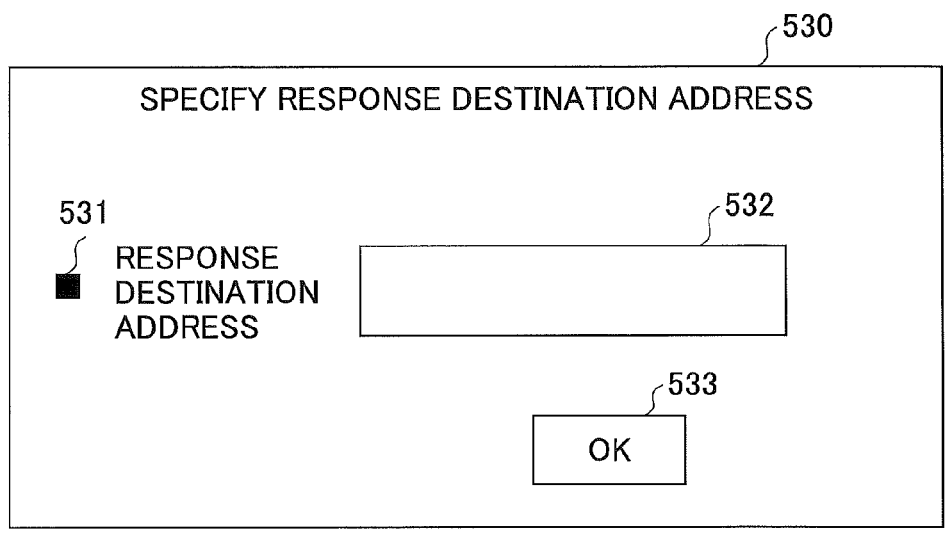
FIG. 23 is a diagram illustrating an example display of a response destination address specifying screen according to the fourth embodiment.
FIG. 24 is a diagram illustrating a configuration of a PIN code management table according to the fourth embodiment.

FIG. 23 is a diagram illustrating an example display of a response destination address specifying screen according to this embodiment. Referring to FIG. 23, a response destination address specifying screen 530 includes a check button 531, an address input field 532, and an OK button 533.

The address input field 532 is a field that receives an input of the email address of the response destination (transmission destination) (hereinafter referred to as "response destination address") of an email message that includes a PIN code to be issued. The check button 531 is a button for receiving a determination as to whether to receive the notification of a PIN code to be issued by email. Inputting to the address input field 532 is enabled by checking the check button 531.

When the OK button 533 is depressed, the Web browser 31 transmits the PIN code issuance request including the organization code entered through the logon screen 520 to the service providing system 70. If a response destination address is entered on the response destination address specifying screen 530, the issuance request includes the response destination address.

Next, the PIN code issuance part 726 of the service providing system 70 generates a PIN code. The PIN code is managed in correlation with the organization code included in the PIN code issuance request by the PIN code management part 727. The PIN code management part 727 manages information on the correspondence between organization codes and PIN codes using, for example, a PIN code management table as illustrated in FIG. 24.

FIG. 24 is a diagram illustrating a configuration of a PIN code management table according to this embodiment. In the PIN code management table, a PIN code generated by the PIN code issuance part 726 is stored in correlation with a corresponding organization code. The PIN code management table may be implemented using, for example, a memory or a secondary storage device of a computer in which the PIN code management part 727 is implemented. Multiple PIN codes different from each other may be correlated with the same organization code. This is because PIN codes may be issued to multiple users in the same organization (company).

Next, in step S443, the PIN code management part 727 determines whether a response destination address is specified in the PIN code issuance request. If a response destination address is specified (YES in step S443), in step S444, the PIN code management part 727 transmits an email message including the generated PIN code to the response destination address. If no response destination address is specified (NO in step S443), in step S445, the PIN code management part 727 returns a response to the PIN code issuance request including a Web page that causes the generated PIN code to be displayed to the Web browser 31.

In either case, it is possible for a user to check the PIN code. It is possible for a user to perform the logon of Pattern 2 illustrated with reference to FIG. 20 using the PIN code.

Next, a description is given, using a sequence diagram, of a procedure related to a scenario of part of the procedures illustrated above using flowcharts.

Figure 25:
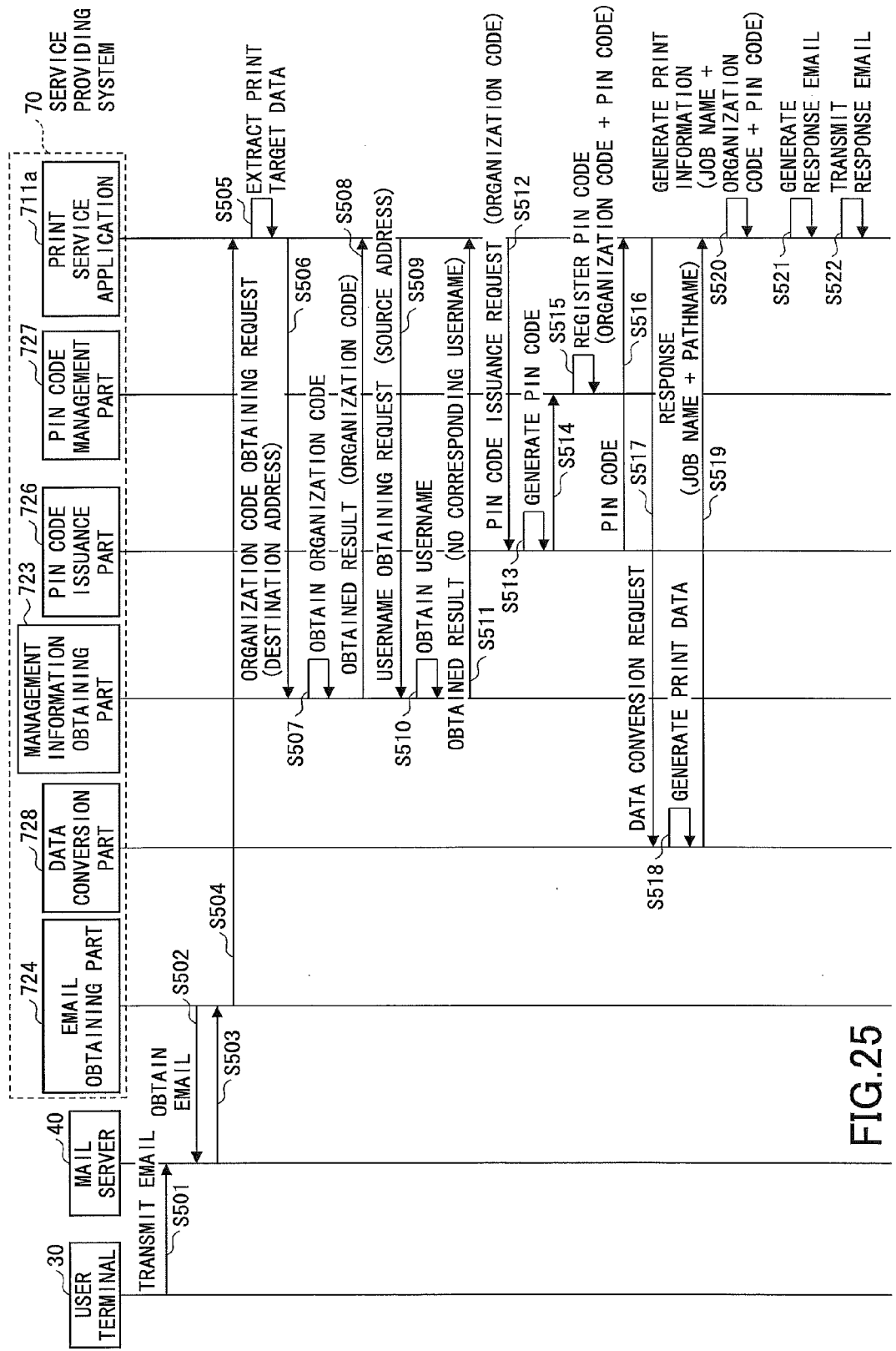
FIG. 25 is a sequence diagram for illustrating a procedure for a process for registration of print information using a print request email message and issuance of a PIN code according to the fourth embodiment.

FIG. 25 is a sequence diagram for illustrating a procedure for a process for registration (storage) of print information using a print request email message and issuance of a PIN code. That is, FIG. 25 is a sequence diagram illustrating a procedure in the case where no username is specified (the case of NO in step S405) in the procedure of FIG. 18.

In step S501, the email transmission part 32 of the user terminal 30 transmits a print request email message to an email address assigned to an organization in which a user is located. The print request email message is forwarded to the mail server 40 in accordance with, for example, a simple mail transfer protocol (SMTP).

In steps S502 and S503, the email obtaining part 724 of the service providing system 70 obtains the print request email message stored in the mail server in accordance with, for example, a post office protocol (POP). In step S504, the email obtaining part 724 forwards the obtained print request email message to the print service application 711a. In step S505, the email analysis part 81 of the print service application 711a extracts print target data from the print request email message.

Next, in step S506, the organization code specification part 82 of the print service application 711a requests the management information obtaining part 723 to obtain an organization code corresponding to the destination address of the print request email message. In step S507, the management information obtaining part 723 obtains an organization code stored in correlation with the destination address in the address corresponding information storage part 731 (FIG. 12). In step S508, the management information obtaining part 723 returns the organization code (hereinafter referred to "target organization code") to the organization code specification part 82.

Next, in step S509, the username specification part 83 of the print service application 711a requests the management information obtaining part 723 to obtain a username corresponding to the source address of the print request email message. In step S510, the management information obtaining part 723 makes an attempt to obtain a username stored in correlation with the source address in the user information storage part 733 (FIG. 19). Here, it is assumed that no corresponding username is obtained. Accordingly, in step S511, the management information obtaining part 723 returns a response indicating the absence of a corresponding username to the username specification part 83.

In response to no specification (identification) of a username, in step S512, the username specification part 83 specifies the target organization code and requests the PIN code issuance part 726 to issue a PIN code. In step S513, the PIN code issuance part 726 generates a PIN code. In step S514, the PIN code issuance part 726 transmits the PIN code and the target organization code to the PIN code management part 727. In step S515, the PIN code management part 727 registers the organization code and the PIN code with the PIN code management table (FIG. 24) in correlation with each other. In step S516, the PIN code issuance part 726 returns a response including the PIN code to the username specification part 83.

Next, in step S517, the print information generation part 84 requests the data conversion part 728 to convert the print target data into print data. In step S518, the data conversion part 728 generates print data based on the print target data, and stores the generated print data in a secondary storage device. The data conversion part 728 assigns identification information (data ID) to the generated print data. According to the fourth embodiment, the data ID is determined as a job name. Next, in step S519, the data conversion part 728 returns a response including the job name and the pathname of a file in which the print data are stored to the print information generation part 84.

In step S520, the print information generation part 84 generates print information including the job name, the target organization code, the PIN code, and the pathname of a file in which the print data are stored. While the print information may be described above as including print data, the print information may include, instead of print data, information that makes it possible to identify print data, such as the pathname of print data. Accordingly, the pathname of print data may be stored in the item of print data in FIG. 13.

Next, in step S521, the response email generation part 85 of the print service application 711a generates a response email message including the job name and the PIN code. Next, in step S522, the email returning part 86 transmits the response email to the source address of the print request email message.

Figure 26:
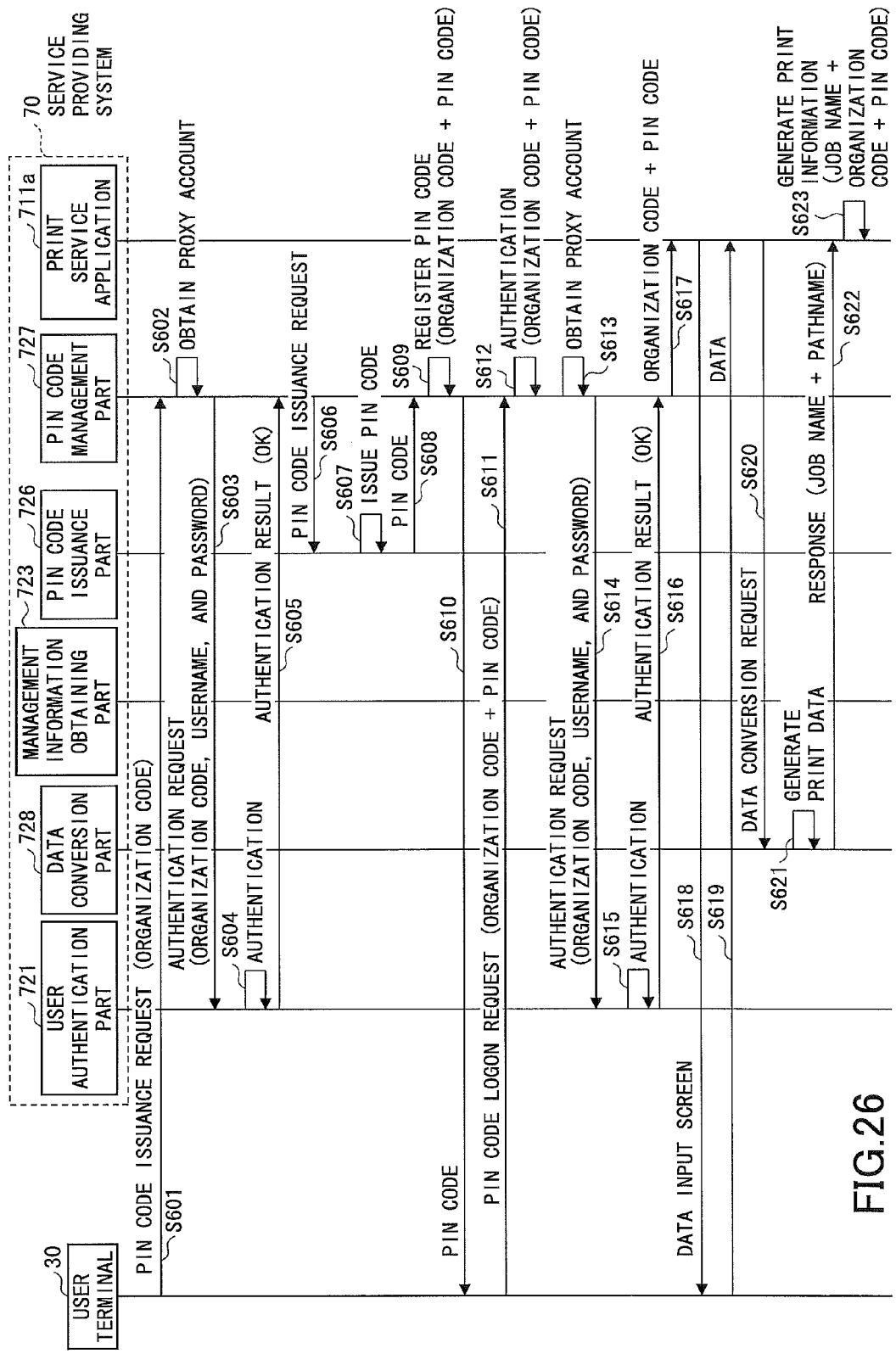
FIG. 26 is a sequence diagram for illustrating a procedure for a process for issuance of a PIN code and registration of print information through a Web interface according to the fourth embodiment.

Next, FIG. 26 is a sequence diagram for illustrating a procedure for a process for issuance of a PIN code and registration (storage) of print information through a Web interface. That is, FIG. 26 is a sequence diagram illustrating a procedure in the case where a PIN code is issued through the procedure of FIG. 22 and print information is registered after logging on based on an organization code and the PIN code in FIG. 20.

In step S601, the Web browser 31 of the user terminal 30, based on inputs to the logon screen 520 (FIG. 21) and the response destination address specifying screen 530 (FIG. 23), specifies an organization code and transmits a PIN code issuance request to the service providing system 70.

In step S602, the PIN code management part 727 obtains a proxy account from a proxy account management table in response to the issuance request. The proxy account is an account that is used in place of a true account (a username and a password) for a user. That is, it is highly likely that a user who requests issuance of a PIN code does not have an account. Accordingly, such a user is prevented from going through authentication by the user authentication part 721 and is consequently prevented from logging on to the service providing system 70. Therefore, a proxy account is used.

FIG. 27 is a diagram illustrating a configuration of a proxy account management table. Referring to FIG. 27, the username and password of a proxy account is registered with the proxy account management table in correlation with a corresponding organization code. Accordingly, in step S602, a username and a password corresponding to (correlated with) the organization code specified in the PIN code issuance request are obtained.

The username and password of the manager of an organization may be used as a proxy account.

Next, in step S603, the PIN code management part 727 specifies the organization code and the username and password of the proxy account, and transmits an authentication request to the user authentication part 721. In step S604, the user authentication part 721 performs authentication with respect to the organization code, the username, and the password, referring to the user information storage part 733 (FIG. 19). Next, in step S605, the user authentication part 721 returns the result of the authentication to the PIN code management part 727.

In the case of an authentication success, in step S606, the PIN code management part 727 requests the PIN code issuance part 726 to issue a PIN code. In step S607, the PIN code issuance part 726 generates a PIN code. In step S608, the PIN code issuance part 726 returns the generated PIN code to the PIN code management part 727. In step S609, the PIN code management part 727 registers the target organization code and the PIN code with the PIN code management table (FIG. 24) in correlation with each other. Next, in step S610, the PIN code management part 727 transmits a response including the PIN code to, for example, the user terminal 30. The form of the response may be either email or a Web page. In the case of email, an email message including the PIN code is transmitted to the response destination address specified in the PIN code issuance request. Accordingly, there remains a possibility that the email message is received by a terminal other than the user terminal 30.

A user who has obtained the PIN code may log on to the service providing system 70 using the PIN code. Therefore, the user enters the organization code and the PIN code and depresses the OK button 521 on the logon screen 520 (FIG. 21) displayed on the Web browser 31 of the user terminal 30. In response to the depression of the OK button 521, in step S611, the Web browser 31 transmits a request to log on with the PIN code to the service providing system 70. The organization code and the PIN code entered on the logon screen 520 are specified in the logon request. However, if the uniqueness of the PIN code is guaranteed through multiple organizations, the PIN code alone may be specified. In this case, information specified or identified by a combination of the organization and the PIN code in the following process may be specified or identified using the PIN code alone.

In step S612, the PIN code management part 727 of the service providing system 70 performs authentication with respect to the organization code and the PIN code specified in the logon request. Specifically, the PIN code management part 727 determines whether a combination of the organization code and the PIN code is stored in the PIN code management table. If the combination is stored in the PIN code management table, the authentication succeeds. If the combination is not stored in the PIN code management table, the authentication fails.

When the authentication of the PIN code succeeds, in steps S613 through S616, authentication using a proxy account is performed in the same procedure as in steps S602 through S605. The success of this authentication is the success of logon. Therefore, in step S617, the PIN code management part 727 notifies the print service application 711a of the organization code and the PIN code of the successful logon.

In step S618, the print service application 711a includes a Web page for displaying a data input screen in a response to the request to log on with the PIN code, and returns the response to the user terminal 30. The Web browser 31 of the user terminal 30 causes a data input screen to be displayed based on the Web page.

When a file is selected through the data input screen in the user terminal 30, in step S619, the Web browser 31 transmits data stored in the selected file to the print service application 711a. Next, in steps S620 through S623, print data are generated with respect to the data, and print information including the pathname of the print data, a job name, the organization code, and the PIN code is stored in the print information storage part 734 in the same procedure as in steps S517 through S520 of FIG. 25.

Next, FIG. 28 is a diagram for illustrating a procedure for a process for outputting print data. That is, FIG. 28 illustrates a procedure for causing the image forming apparatus 20a to execute a print job based on print data included in print information registered (stored) by the process of FIG. 25 or FIG. 26.

Referring to FIG. 28, steps S701 through S710 illustrate a procedure in the case where a normal logon (a logon based on an organization code, an apparatus ID, a username, and a password) is performed from the image forming apparatus 20a. Meanwhile, steps S801 through S810 illustrate a procedure in the case where a logon using a PIN code (a logon based on an organization code, an apparatus ID, and a PIN code) is performed from the image forming apparatus 20a.

When a username and a password are input through the logon screen 510 (FIG. 10) displayed on the operations panel 25 of the image forming apparatus 20a, and the OK button 511 is depressed on the logon screen 510, in step S701, the authentication control part 221 transmits a logon request to the service providing system 70. An organization code, an apparatus ID, a username, and a password are specified in the logon request. The organization code and the apparatus ID may be prestored in the HDD 214 of the image forming apparatus 20a. However, the organization code may alternatively be input through the logon screen 510. In this case, the logon screen 510 may include a field for inputting an organization code.

When the logon request is received by the service providing system 70, in step S702, the apparatus authentication part 722 performs authentication. Specifically, the authentication is determined to be successful when the following two conditions are satisfied. The first condition is that a combination of the organization code and the apparatus ID specified in the logon request is stored in the user apparatus information storage part 732 (FIG. 14). The second condition is that a combination of the organization code (hereinafter referred to as "target organization code"), the username (hereinafter referred to as "target username"), and the password specified in the logon request is stored in the user information storage part 733 (FIG. 19).

In the case of successful authentication, in step S703, the apparatus authentication part 722 specifies the target organization code and the target username, and transmits a print information list obtaining request to the print service application 711a. The authentication result, the target organization code, and the target username are specified in the obtaining request.

In step S704, the print information providing part 87 of the print service application 711a obtains a list of print information (items) that includes the target organization code and the target username from the print information storage part 734. Here, the substance (real data) of print data may not be obtained. Next, in step S705, the print information providing part 87 returns information indicating a logon success and the obtained print information list to the image forming apparatus 20a.

In step S706, the print information obtaining part 222 of the image forming apparatus 20a causes a list of job names included in the returned print information (items) to be displayed on the operations panel 25. In response to the selection of one or more job names from the list, in step S707, the print information obtaining part 222 transmits a request for obtaining print data corresponding to the selected job names to the print service application 711a. In step S708, the print information providing part 87 of the print service application 711a obtains print data correlated with the job names specified in the obtaining request, referring to the print information storage part 734. Next, in step S709, the print information providing part 87 returns the print data to the image forming apparatus 20a.

In step S710, the print control part 223 of the image forming apparatus 20a controls execution of print jobs related to the print data. As a result, paper on which the print data are printed is output.

Next, a description is given of the case of logging on using a PIN code.

When a PIN code is input through the logon screen 510 (FIG. 10) displayed on the operations panel 25 of the image forming apparatus 20a, and the OK button 511 is depressed, the authentication control part 221 transmits a logon request to the service providing system 70. An organization code, an apparatus ID, and a PIN code are specified in the logon request.

Next, in steps S802 through S806, the process as in steps S612 through S616 of FIG. 26 is executed. Next, in step S807, in step S807, the PIN code management part 727 specifies the organization code and the PIN code of the successful logon, and transmits a print data obtaining request to the print service application 711a.

Next, in step S808, the print information providing part 87 of the print service application 711a obtains print data correlated with the organization code and the PIN code specified in the print data obtaining request, referring to the print information storage part 734. Next, in step S809, the print information providing part 87 returns the print data to the image forming apparatus 20a.

In step S810, the print control part 223 of the image forming apparatus 20a controls execution of a print job related to the print data. As a result, paper on which the print data are printed is output.

In FIG. 28, in the case of logging on using a PIN code, a description is given of an example where the image forming apparatus 20a is provided with no list of print information. This is because a user who logs on using a PIN code is a temporary user of the image forming apparatus 20a, so that it is highly likely that the registered (stored) print information of the user is limited in amount. That is, it is highly likely that such a user wishes to print out all the registered print information. However, in the case of logging on using a PIN code as well, the same process as in step S705 and its subsequent steps may be executed. That is, print information to be subjected to printing may be selected by a user from the print information correlated with the PIN code specified in the logon request.

In the above-described embodiments, the management server 10, the authentication server 50 and the storage server 60, or the service providing system 70 is an example of an information processing system. The print data are an example of output data. That is, the above-described embodiments may be applied to a case where data other than print data are output to an image forming apparatus or other apparatuses.

Examples of an output data reception part include the email reception part 11 and the email obtaining part 724. Examples of an identification part include the address determination part 12 and the username specification part 83. Examples of user identification information include the username. Examples of data identification information include the PIN code. That is, the PIN code may be generated for each print request (on a print request basis). Accordingly, the PIN code may also be considered as information that identifies data to be printed.

Examples of a storing part include the print information generation part 14 and the print information generation part 84. Examples of a notification part include the email returning part 16, the email returning part 86, and the PIN code management part 727. Examples of a transmission part include the print information providing part 63 and the print information providing part 87. Examples of a user information storage part include the user information storage part 52 and the user information storage part 733. Examples of a data storage part include the print information storage part 62 and the print information storage part 734.

Examples of mail data include the print request email message and the print target data included in the print request email message. Examples of a data identification information storage part include the PIN code management table. Examples of a first reception part and a second reception part include the PIN code management part 727. Examples of a third reception part include the user authentication part 721.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus, comprising:
a processor; and
a memory storing a program that, when executed by the processor, causes the information processing apparatus to
obtain output request data transmitted from a user terminal;
obtain first identification information and second identification information from management information stored in a storage unit based on the obtained output request data, the first identification information and the second identification information being correlated with each other in the management information in the storage unit, the first identification information identifying one or more output apparatuses and the second identification information being user identification information, the obtained first identification information and the obtained second identification information being correlated in the management information;
associate and manage output information pertaining to the output request data, the obtained first identification information, and the obtained second identification information;
receive a request to obtain the managed output information, the request being transmitted from an output apparatus; and
transmit the output information managed in association with the first identification information of the output apparatus transmitting the request and the second identification information of the requesting user at the output apparatus in response to the request to obtain the output information.

2. The information processing apparatus as claimed in claim 1, wherein
the output request data is email transmitted from the user terminal, and
the information processing apparatus is caused to obtain the first identification information and the second identification information based on address information of the obtained output request data.

3. The information processing apparatus as claimed in claim 2, wherein
the management information includes first address information associated with the first identification information and second address information associated with the second identification information, and
the information processing apparatus is caused to obtain the first identification information associated with a destination address of the obtained output request data in the first address information and the second identification information associated with a source address of the obtained output request data in the second address information.

4. The information processing apparatus as claimed in claim 3, wherein
one item of the first identification information is associated with a plurality of items of the second identification information in the management information.

5. The information processing apparatus as claimed in claim 1, wherein
the output request data requests printing of print target data included in the output request data,
the output information is the print target data or print data generated from the print target data, and
the output apparatus is an image forming apparatus including a print unit that performs printing.

6. The information processing apparatus as claimed in claim 1, wherein the output apparatus is a projector.

7. The information processing apparatus as claimed in claim 1, wherein the information processing apparatus is further caused to transmit the output information managed and associated with the first and second identification information to the user terminal.

8. An information processing system, comprising:
at least one information processing apparatus,
the at least one information processing apparatus including
a processor; and
a memory storing a program that, when executed by the processor, causes the at least one information processing apparatus to
obtain output request data transmitted from a user terminal;
obtain first identification information and second identification information from management information stored in a storage unit based on the obtained output request data, the first identification information and the second identification information being correlated with each other in the management information in the storage unit, the first identification information identifying one or more output apparatuses and the second identification information being user identification information, the obtained first identification information and the obtained second identification information being correlated in the management information;
associate and manage output information pertaining to the output request data, the obtained first identification information, and the obtained second identification information;
receive a request to obtain the managed output information, the request being transmitted from an output apparatus; and
transmit the output information managed in association with the first identification information of the output apparatus transmitting the request and the second identification information of the requesting user at the output apparatus in response to the request to obtain the output information.

9. The information processing system as claimed in claim 8, wherein
the output request data is email transmitted from the user terminal, and
the at least one information processing apparatus is caused to obtain the first identification information and the second identification information based on address information of the obtained output request data.

10. The information processing system as claimed in claim 9, wherein
the management information includes first address information associated with the first identification information and second address information associated with the second identification information, and
the at least one information processing apparatus is caused to obtain the first identification information associated with a destination address of the obtained output request data in the first address information and the second identification information associated with a source address of the obtained output request data in the second address information.

11. The information processing system as claimed in claim 10, wherein
one item of the first identification information is associated with a plurality of items of the second identification information in the management information.

12. The information processing system as claimed in claim 8, wherein
the output request data requests printing of print target data included in the output request data,
the output information is the print target data or print data generated from the print target data, and
the output apparatus is an image forming apparatus including a print unit that performs printing.

13. The information processing system as claimed in claim 8, wherein the output apparatus is a projector.

14. The information processing system as claimed in claim 8, wherein the at least one information processing apparatus is further caused to transmit the output information managed and associated with the first and second identification information to the user terminal.

15. An information processing method executed in an information processing system in response to an operation performed by a user, the information processing system including a user terminal, at least one information processing apparatus, and an output apparatus, the information processing method comprising:
registering management information with the at least one information processing apparatus in response to an operation to request registration of the management information performed by the user, the management information including first identification information and second identification information, the first identification information identifying the output apparatus, the second identification information being user identification information;

registering the first identification information with the output apparatus in response to an operation to request registration of the first identification information performed by the user;

transmitting, by the user terminal, output request data in response to an operation to request transmission of the output request data performed by the user;

obtaining, by the at least one information processing apparatus, the output request data transmitted from the user terminal;

obtaining, by the at least one information processing apparatus, the first identification information and the second identification information from the management information stored in a storage unit based on the obtained output request data, the first identification information and the second identification information being correlated in the management information in the storage unit, the obtained first identification information and the obtained second identification information being correlated in the management information;

associating and managing, by the at least one information processing apparatus, output information pertaining to the output request data, the obtained first identification information, and the obtained second identification information;

obtaining, by the output apparatus, the second identification information in response to an operation to request a logon to the output apparatus performed by the user; and obtaining the output information from the at least one information processing apparatus and outputting the obtained output information by the output apparatus in response to an operation to request outputting of the output information performed by the user, wherein the obtained output information is managed in association with the obtained second identification information of the requesting user at the output apparatus and the first identification information registered with the output apparatus.

16. The information processing method as claimed in claim 15, wherein the output request data is email transmitted from the user terminal, and the output information is managed in association with the first identification information and the second identification information specified based on address information of the obtained output request data.

17. The information processing method as claimed in claim 16, further comprising:

registering first address information in association with the first identification information registered with the management information in response to an operation to request registration of the first address information with the at least one information processing apparatus performed by the user; and registering second address information in association with the second identification information registered with the management information in response to an operation to request registration of the second address information with the at least one information processing apparatus performed by the user, wherein the output request data is email in which address information of a destination specified by the user and address information of a source address registered with the user terminal are specified, and the obtained output information is managed in association with the second identification information associated with the address information of the source address of the obtained output request data specified from the management information and the first identification information associated with the address information of the destination of the obtained output request data.

18. The information processing method as claimed in claim 17, wherein one item of the first identification information is associated with one or more items of the second identification information in the management information.

19. The information processing method as claimed in claim 15, further comprising:

transmitting the output information managed and associated with the first and second identification information to the user terminal.

* * * * *